(12) United States Patent  
Ouderkirk et al.

(10) Patent No.: US 6,924,014 B2
(45) Date of Patent: **\*Aug. 2, 2005**

(54) HIGH EFFICIENCY OPTICAL DEVICES

(75) Inventors: Andrew J. Ouderkirk, Woodbury, MN (US); Michael F. Weber, Shoreview, MN (US); Sanford Cobb, Jr., Lakeland, MN (US); David L. Wortman, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/700,137

(22) Filed: Nov. 3, 2003

(65) Prior Publication Data

US 2004/0175552 A1 Sep. 9, 2004

Related U.S. Application Data

(63) Continuation of application No. 09/777,455, filed on Feb. 6, 2001, now Pat. No. 6,641,883, which is a division of application No. 09/461,245, filed on Dec. 15, 1999, now Pat. No. 6,210,785, which is a continuation of application No. 08/494,366, filed on Jun. 26, 1995, now Pat. No. 6,080,467.

(51) Int. Cl.$^7$ .......................... B32B 7/02; G27B 27/00; G27B 27/10; G27B 27/28

(52) U.S. Cl. .................. 428/35.7; 428/36.9; 428/36.91; 428/212; 359/485; 359/487; 359/489; 359/494; 359/497; 359/500; 359/591; 359/592; 359/595; 359/597; 359/598; 359/594

(58) Field of Search ............................... 428/212, 36.9, 428/36.91, 35.7; 359/485, 487, 489, 494, 497, 500, 591, 592, 595, 597, 598, 594

(56) References Cited

U.S. PATENT DOCUMENTS

| | | |
|---|---|---|
| ,540,768 A | 6/1895 | Western |
| 3,124,639 A | 3/1964 | Kahn |
| 3,442,755 A | 5/1969 | Walters et al. |
| 3,535,016 A | 10/1970 | Malifaud |
| 3,565,985 A | 2/1971 | Schrenk et al. |
| 3,610,729 A | 10/1971 | Rogers |
| 3,637,455 A | 1/1972 | Pearson et al. |
| 3,647,612 A | 3/1972 | Schrenk et al. |
| 3,711,176 A | 1/1973 | Alfrey, Jr. et al. |
| 3,740,112 A | 6/1973 | Lundgren |
| 3,759,647 A | 9/1973 | Schrenk et al. |
| 3,773,882 A | 11/1973 | Schrenk |
| 3,801,429 A | 4/1974 | Schrenk et al. |
| 3,860,036 A | 1/1975 | Newman, Jr. |
| 4,023,903 A * | 5/1977 | Scheib ........................ 355/71 |

(Continued)

FOREIGN PATENT DOCUMENTS

| | | |
|---|---|---|
| CA | 1327286 | 3/1994 |
| EP | 0 062 751 A1 | 10/1982 |
| EP | 0 404 463 A2 | 12/1990 |

(Continued)

OTHER PUBLICATIONS

Alfrey et al., "Physical Optics of Iridescent Mulilayered Plastic Films", Polymer Engineering and Science, vol. 9, No. 6, Nov. 1969, pp. 400–404.

(Continued)

Primary Examiner—Vivian Chen
(74) Attorney, Agent, or Firm—Milena G. Higgins; Stephen C. Jensen

(57) ABSTRACT

Optical devices according to the present invention include a multilayer optical film in which at least one of the layers comprises an oriented birefringent polymer. The multilayer optical film exhibits low absorptivity and can reflect light approaching at shallow angles as well as normal to the film.

20 Claims, 16 Drawing Sheets

U.S. PATENT DOCUMENTS

| | | |
|---|---|---|
| 4,025,688 A | 5/1977 | Nagy et al. |
| 4,094,947 A | 6/1978 | Alfrey, Jr. et al. |
| 4,260,220 A * | 4/1981 | Whitehead .................. 385/133 |
| 4,268,127 A | 5/1981 | Oshima et al. |
| 4,310,584 A | 1/1982 | Cooper et al. |
| 4,315,258 A | 2/1982 | McKnight et al. |
| 4,329,382 A | 5/1982 | Truskolaski et al. |
| 4,422,719 A * | 12/1983 | Orcutt ........................ 385/123 |
| 4,446,305 A | 5/1984 | Rogers et al. |
| 4,459,642 A * | 7/1984 | Mori .......................... 362/558 |
| 4,476,168 A | 10/1984 | Aoyama |
| 4,500,173 A | 2/1985 | Leibowitz et al. |
| 4,511,215 A | 4/1985 | Butler |
| 4,515,441 A | 5/1985 | Wentz |
| 4,515,837 A | 5/1985 | Cheng |
| 4,520,189 A | 5/1985 | Rogers et al. |
| 4,521,588 A | 6/1985 | Rogers et al. |
| 4,525,413 A | 6/1985 | Rogers et al. |
| 4,540,623 A | 9/1985 | Im et al. |
| 4,615,579 A * | 10/1986 | Whitehead .................. 385/133 |
| 4,688,897 A | 8/1987 | Grinberg et al. |
| 4,720,426 A | 1/1988 | Englert et al. |
| 4,750,798 A * | 6/1988 | Whitehead .................. 385/133 |
| 4,787,708 A * | 11/1988 | Whitehead .................. 385/133 |
| 4,791,540 A | 12/1988 | Dreyer, Jr. et al. |
| 4,797,308 A | 1/1989 | Mattin |
| 4,805,984 A * | 2/1989 | Cobb, Jr. .................... 385/133 |
| 4,813,765 A | 3/1989 | Negishi |
| 4,834,495 A * | 5/1989 | Whitehead et al. ......... 385/133 |
| 4,906,070 A * | 3/1990 | Cobb, Jr. .................... 359/834 |
| 4,913,505 A * | 4/1990 | Levy .......................... 385/147 |
| 4,937,134 A | 6/1990 | Schrenk et al. |
| 5,089,318 A | 2/1992 | Shetty et al. |
| 5,094,788 A | 3/1992 | Schrenk et al. |
| 5,094,793 A | 3/1992 | Schrenk et al. |
| 5,095,210 A | 3/1992 | Wheatley et al. |
| 5,103,337 A | 4/1992 | Schrenk et al. |
| 5,122,905 A | 6/1992 | Wheatley et al. |
| 5,122,906 A | 6/1992 | Wheatley |
| 5,126,880 A | 6/1992 | Wheatley et al. |
| 5,149,578 A | 9/1992 | Wheatley et al. |
| 5,188,760 A | 2/1993 | Hikmet et al. |
| 5,202,074 A | 4/1993 | Schrenk et al. |
| 5,202,950 A | 4/1993 | Arego et al. |
| 5,211,878 A | 5/1993 | Reiffenrath et al. |
| 5,217,794 A | 6/1993 | Schrenk |
| 5,224,770 A * | 7/1993 | Simmons et al. ............. 362/29 |
| 5,233,465 A | 8/1993 | Wheatley et al. |
| 5,234,729 A | 8/1993 | Wheatley et al. |
| 5,235,443 A | 8/1993 | Barnik et al. |
| 5,237,641 A | 8/1993 | Jacobson et al. |
| 5,269,995 A | 12/1993 | Ramanathan et al. |
| 5,278,694 A | 1/1994 | Wheatley et al. |
| 5,294,657 A | 3/1994 | Melendy et al. |
| 5,303,322 A | 4/1994 | Winston et al. |
| RE34,605 E | 5/1994 | Schrenk et al. |
| 5,316,703 A | 5/1994 | Schrenk |
| 5,319,478 A | 6/1994 | Fünfschilling et al. |
| 5,339,198 A | 8/1994 | Wheatly et al. |
| 5,339,382 A * | 8/1994 | Whitehead .................. 385/146 |
| 5,353,154 A | 10/1994 | Lutz et al. |
| 5,360,659 A | 11/1994 | Arends et al. |
| 5,389,324 A | 2/1995 | Lewis et al. |
| 5,422,756 A | 6/1995 | Weber |
| 5,424,119 A | 6/1995 | Phillips et al. |
| 5,448,404 A | 9/1995 | Schrenk et al. |
| 5,451,449 A | 9/1995 | Shetty et al. |
| 5,468,523 A | 11/1995 | Huss et al. |
| 5,475,785 A * | 12/1995 | Johanson .................... 385/100 |
| 5,481,445 A | 1/1996 | Sitzema et al. |
| 5,481,637 A * | 1/1996 | Whitehead .................. 385/125 |
| 5,486,884 A | 1/1996 | De Vaan |
| 5,486,935 A | 1/1996 | Kalmanash |
| 5,486,949 A | 1/1996 | Schrenk et al. |
| 5,528,720 A * | 6/1996 | Winston et al. ............. 385/146 |
| 5,540,978 A | 7/1996 | Schrenk |
| 5,550,660 A | 8/1996 | Yang |
| 5,552,927 A | 9/1996 | Wheatly et al. |
| 5,568,316 A | 10/1996 | Schrenk et al. |
| 5,612,820 A | 3/1997 | Schrenk et al. |
| 5,614,274 A | 3/1997 | Huss |
| 5,629,055 A | 5/1997 | Revol et al. |
| 5,661,839 A * | 8/1997 | Whitehead .................. 385/131 |
| 5,686,979 A | 11/1997 | Weber et al. |
| 5,699,188 A | 12/1997 | Gilbert et al. |
| 5,721,603 A | 2/1998 | De Vaan et al. |
| 5,744,534 A | 4/1998 | Ishiharada et al. |
| 5,751,388 A | 5/1998 | Larson |
| 5,767,935 A | 6/1998 | Ueda et al. |
| 5,770,306 A | 6/1998 | Suzuki et al. |
| 5,783,120 A | 7/1998 | Ouderkirk et al. |
| 5,793,456 A | 8/1998 | Broer et al. |
| 5,808,794 A | 9/1998 | Weber et al. |
| 5,825,542 A | 10/1998 | Cobb, Jr. et al. |
| 5,825,543 A | 10/1998 | Ouderkirk et al. |
| 5,882,774 A | 3/1999 | Jonza et al. |
| 5,940,149 A | 8/1999 | Vanderwerf |
| 5,962,114 A | 10/1999 | Jonza et al. |
| 5,965,247 A | 10/1999 | Jonza et al. |
| 6,080,467 A * | 6/2000 | Weber et al. ............... 428/212 |
| 6,082,876 A | 7/2000 | Hanson et al. |
| 6,101,032 A | 8/2000 | Wortman et al. |
| 6,117,530 A * | 9/2000 | Jonza et al. ................. 428/212 |
| 6,157,490 A * | 12/2000 | Wheatley et al. ........... 359/589 |
| 6,210,785 B1 | 4/2001 | Weber et al. |
| 6,296,927 B1 * | 10/2001 | Jonza et al. ................. 428/212 |
| 6,451,414 B1 * | 9/2002 | Wheatley et al. ........... 428/212 |
| 6,531,230 B1 * | 3/2003 | Weber et al. ............... 428/480 |
| 6,641,883 B2 * | 11/2003 | Weber et al. .............. 428/35.7 |
| 6,697,195 B2 | 2/2004 | Weber et al. |
| 2002/0008970 A1 | 1/2002 | Hanson et al. |

FOREIGN PATENT DOCUMENTS

| | | |
|---|---|---|
| EP | 0 426 636 A2 | 5/1991 |
| EP | 0 469 732 A2 | 2/1992 |
| EP | 0 488 544 A1 | 6/1992 |
| EP | 0 514 223 A1 | 11/1992 |
| EP | 0 597 261 A1 | 5/1994 |
| EP | 0 606 939 A1 | 7/1994 |
| GB | 2 028 528 A | 3/1980 |
| JP | 5-288910 | 11/1993 |
| JP | 6-11607 | 1/1994 |
| JP | 7-216328 | 8/1995 |
| JP | 3516976 | 4/2004 |
| WO | WO 91/09719 | 7/1991 |
| WO | WO 94/10589 | 5/1994 |
| WO | WO 94/11776 | 5/1994 |
| WO | WO 95/17303 | 6/1995 |
| WO | WO 95/17691 | 6/1995 |
| WO | WO 95/17692 | 6/1995 |
| WO | WO 95/17699 | 6/1995 |
| WO | WO 95/27919 | 10/1995 |
| WO | WO 96/19347 | 6/1996 |
| WO | WO 96/31794 | 10/1996 |
| WO | WO 97/01440 | 1/1997 |
| WO | WO 97/01774 | 1/1997 |
| WO | WO 97/32226 | 9/1997 |
| WO | WO 99/36248 | 7/1999 |
| WO | WO 99/36262 | 7/1999 |

OTHER PUBLICATIONS

Boese et al., Chain Orientation and Anisotrophies in Optical and Dielectric Properties in Thin Films of Stiff Polyimides0, Journal of Polymer Science: Part B: Polymer Physics, vol. 30, pp. 1321–1327 (1992).

Hecht et al., Optics, Fourth Printing, Addison–Wesley Publishing Company, pp. 301–316, (1979).

Hodgkinson et al., Effective Principal Refractive Indices and Column Angles for Periodic Stacks of Thin Birefringent Films, Journal of the Optical Society of America, vol. 10, No. 9, pp. 2065–2071, (1993).

Im, J. et al., Coextruded Microlayer Film and Sheet, Journal of Plastic Film and Sheeting, vol. 4, pp. 104–115, (1988).

Radford et al., Reflectivity of Iridescent Coextruded Multi-layered Plastic Films, "Polymer Engineering And Science", vol. 13, No. 3, (1973), Dow Chemical Co., presented at American Chemical Society Symposium on "Coextruded Plastic Films, Fibers, and Composites", Apr. 9–14, 1972.

Scheffer, Terry J., Twisted Nematic Display with Cholesteric Reflector, Journal of Applied Physics, vol. 8, pp. 1441–1448 (1975).

Schrenk et al., "Coextruded Elastomeric Optical Interference Films", SPE Annual Technical Conference, Atlanta, Georgia, pp. 1703–1707 (1988).

Schrenk et al., "Coextruded Multilayer Polymer Films and Sheet", Polymer Blends, vol. 2, Chapter 15, pp. 129–165, Academic Press, Inc. (1978).

Schrenk et al., "Interfacial Flow Instability in Multilayer Coextrusion", Polymer Engineering and Science, vol. 18, No. 8, p. 620–623 (Jun. 1978).

Schrenk et al., Nanolayer Polymeric Optical Films, Tappi Journal, pp. 169–174 (Jun. 1992).

Schrenk et al., "Coextruded Infrared Reflecting Films", $7^{th}$ Annual Meeting Polymer Processing Society, Hamilton, Ontario, Canada, pp. 222–223 (Apr. 1991).

Schrenk et al., "Coextruded Iridescent Film", Tappi, Paper Synthetics Conference, Atlanta, Georgia, pp. 141–145 (Sep. 27–29, 1976).

Schrenk, W., "New Developments in Coextrusion", International Conference on Advances in Polymer Processing, New Orleans, Louisiana, (Apr. 1991).

Weber et al., "Giant Birefringent Optics in Multilayer Polymer Mirrors", Science, vol. 287, No. 5462, Mar. 2000, pp. 2451–2456.

Zang et al., "Giant Anisotropies In The Dielectric Properties Of Quasi–Epitaxial Crystalline Organic Semiconductor Thin Films", Appl. Phys. Letter 59(7), Aug. 1991, pp. 823–825.

* cited by examiner

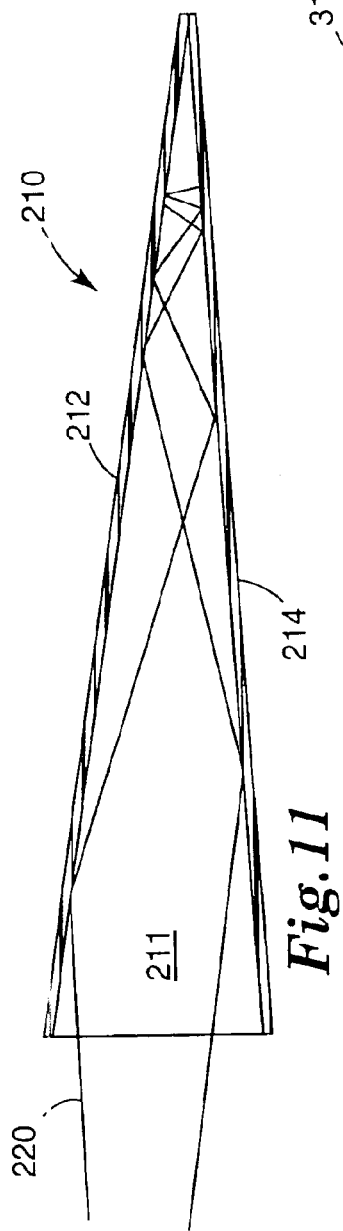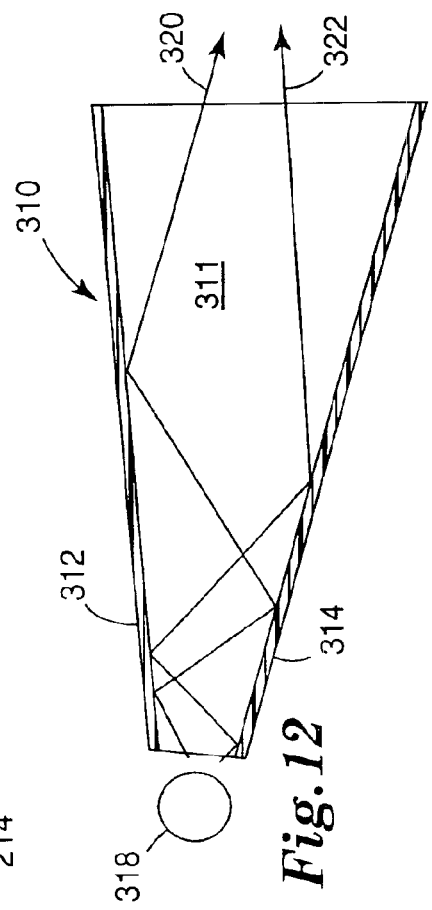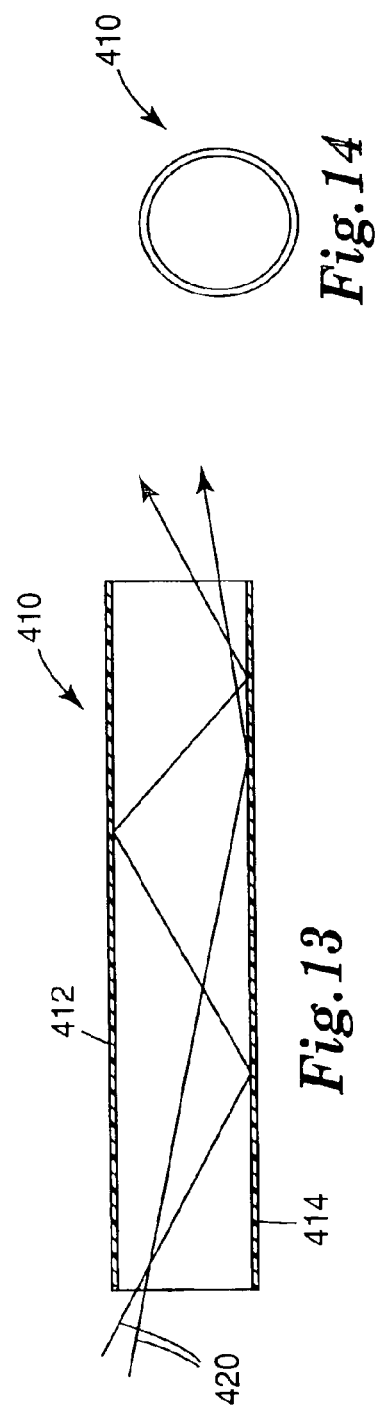

HIGH EFFICIENCY OPTICAL DEVICES

CROSS REFERENCE TO RELATED APPLICATIONS

This application is a continuation of U.S. application Ser. No. 09/777,455, filed Feb. 6, 2001 and issued as U.S. Pat. No. 6,641,883, which is a divisional of U.S. application Ser. No. 09/461,245, filed Dec. 15, 1999 and issued as U.S. Pat. No. 6,210,785, which is a continuation of U.S. application Ser. No. 08/494,366, filed Jun. 26, 1995 and issued as U.S. Pat. No. 6,080,467.

FIELD OF THE INVENTION

The present invention relates to the field of optical devices. More particularly, the present invention relates to optical devices employing multi-layer optical film as reflectors and/or polarizers.

BACKGROUND OF THE INVENTION

Optical devices employing reflectors are used, for example, in displays for laptop computers, hand-held calculators, digital watches and similar devices as well as illuminated signs, light pipes, backlight assemblies and many other devices.

Conventional reflectors, including pigmented surfaces, silvered mirrors, polished metallic or metallized surfaces, etc. suffer from a number of disadvantages in many applications. The conventional reflectors suffer from relatively high absorbance of light incident on their surfaces, typically absorbing about 4–10% of the light incident on them. As a result, the amount of light remaining after each reflection is less than that initially provided. In devices in which multiple reflections are encountered, the overall output of the optical device can be substantially limited. In addition, many of the conventional reflectors are too bulky and/or heavy for many of the applications, particularly in laptop computer displays and other portable devices.

Many optical devices use polarizers, either alone or in combination with reflectors, to provide light having substantially one plane of polarization. Polarized light is especially useful in conjunction with liquid crystal (LC) displays used in many portable devices such as laptop computers and watches, because the LC displays rely on polarized light passing through the LC to display information to a viewer.

Polarizers can be generally categorized as either absorptive or reflective. Typical absorptive polarizers are oriented dyed polymer films, while typical reflective polarizers are tilted thin film polarizers, also known as MacNeille polarizers. Absorptive polarizers do, of course, contribute to the absorptive losses of optical devices in which they are used, thereby limiting the output of those devices.

The absorptive losses of known reflectors and polarizers become much more important when the optical devices are used with a brightness enhancement film such as microreplicated brightness enhancement film or any other type of reflective polarizer which causes light to typically travel through several reflections, thereby amplifying absorptive losses with every reflection. In the highest gain configurations, for, e.g., a single sheet of brightness enhancement film in combination with a reflective polarizer and back reflector, or two sheets of orthogonally crossed sheets of brightness enhancement film, the effective absorptive losses can reduce the total potential light output of an optical display by 10–30%.

This principle of absorptive losses also applies to optical devices employing non-totally internally reflecting surfaces. One example is an optical wedge in which light is directed into a structure having converging reflective surfaces. Optical wedges will typically reflect light many times before it exits the device. With each reflection, however, some of the light which entered the wedge is absorbed by conventional reflectors. As a result, the amount of light exiting the device is typically substantially less than the light entering the device.

Another optical device typically employing reflective surfaces is an illuminated sign which relies on a finite number of light sources and multiple reflections within an optical cavity to disperse the light to illuminate the surface of a sign in a generally uniform manner. To overcome the problems associated with absorptive losses, many signs typically employ numerous light sources, thereby increasing the cost to manufacture and operate the signs.

Yet another optical device which is limited by absorption losses is a light pipe in which light enters the pipe and is reflected along its length numerous times before exiting at a desired location. Each reflection results in some absorption when conventional reflectors are used, thereby limiting throughput of the light pipe.

To overcome some of the problems of weight, bulk and absorption of conventional reflectors, multi-layered polymer films have been used to reflect and/or polarize light. Such polymeric films are, however, subject to a number of other disadvantages including iridescence, as well as poor reflectivity when off-axis light approaches the surface of the film. The off-axis light is typically transmitted through the films, rather than being reflected, thereby resulting in transmissive losses rather than absorptive losses. Whether light is lost through absorption or transmission, however, the output of the optical device is limited.

Other problems with known multi-layer polymer films used to provide reflectors and/or polarizers is that the materials and methods used to manufacture the films presents serious problems due to poor optical transmission, extrudibility, and high costs.

SUMMARY OF THE INVENTION

Optical devices according to the present invention include a multilayer optical film. Optical devices incorporating multilayer optical film according to the present invention enjoy many advantages due to the low absorptivity of the film and its ability to reflect light approaching at shallow angles as well as normal to the film.

In those situations where complete reflectivity is desired, optical devices employing a multilayer optical film according to the present invention can reflect over 99% of the light striking the surface of the film.

If a reflective polarizer is desired, the optical devices can be constructed with a multilayer optical film which transmits a significant amount of light having one plane of polarization while reflecting a significant amount of light having an orthogonally oriented polarization. A further advantage is that the relative percentages of transmitted/reflected light can be largely controlled by the multilayer optical film used in the present invention.

As a result of the unique properties of the multilayer optical film, optical devices according to the present invention are highly efficient at reflecting and transporting light and/or transmitting light of one polarization, whether the light is incident normal to the film surface or off-axis.

Another advantage of optical devices employing multilayer optical film according to the present invention which rely on reflection to transport light is that the devices need not have symmetry to reduce the number of reflections needed to transmit light due to the low absorptivity of the multilayer optical film.

Yet another advantage of optical devices employing multilayer optical films according to the present invention is their relatively low weight as compared to many conventional reflectors and/or polarizers.

Still another advantage of optical devices employing multilayer optical films according to the present invention is that because the film is relatively thin as compared to many conventional reflectors and/or polarizers, the optical devices can be manufactured to occupy limited space in a system employing the device.

Additional features and advantages of optical devices according to the present invention will be apparent upon reading the detailed description of illustrative embodiments below.

BRIEF DESCRIPTION OF THE DRAWINGS

FIG. 11 is a schematic cross-sectional diagram of a converging wedge optical device according to the present invention.

FIG. 12 is a schematic cross-sectional diagram of a diverging wedge optical device according to the present invention.

FIG. 13 is a schematic cross-sectional diagram of a light pipe employing multilayer optical films according to the present invention.

FIG. 14 is a schematic cross-sectional diagram of the device of FIG. 13, taken along a plane transverse to the longitudinal axis of the light pipe.

DETAILED DESCRIPTION OF ILLUSTRATIVE EMBODIMENTS OF THE INVENTION

I. Multilayer Optical Film

The optical devices described herein rely on the unique and advantageous properties of multilayer optical films. The advantages, characteristics and manufacturing of such films are most completely described in U.S. Pat. No. 5,882,774, which is incorporated herein by reference. The multilayer optical film is useful, for example, as highly efficient mirrors and/or polarizers. A relatively brief description of the properties and characteristics of the multilayer optical film is presented below followed by a description of illustrative embodiments of backlight systems using the multilayer optical film according to the present invention.

Multilayer optical films as used in conjunction with the present invention exhibit relatively low absorption of incident light, as well as high reflectivity for off-axis as well as normal light rays. These properties generally hold whether the films are used for pure reflection or reflective polarization of light. The unique properties and advantages of the multi-layer optical film provides an opportunity to design highly efficient backlight systems which exhibit low absorption losses when compared to known backlight systems.

Figure 1A:
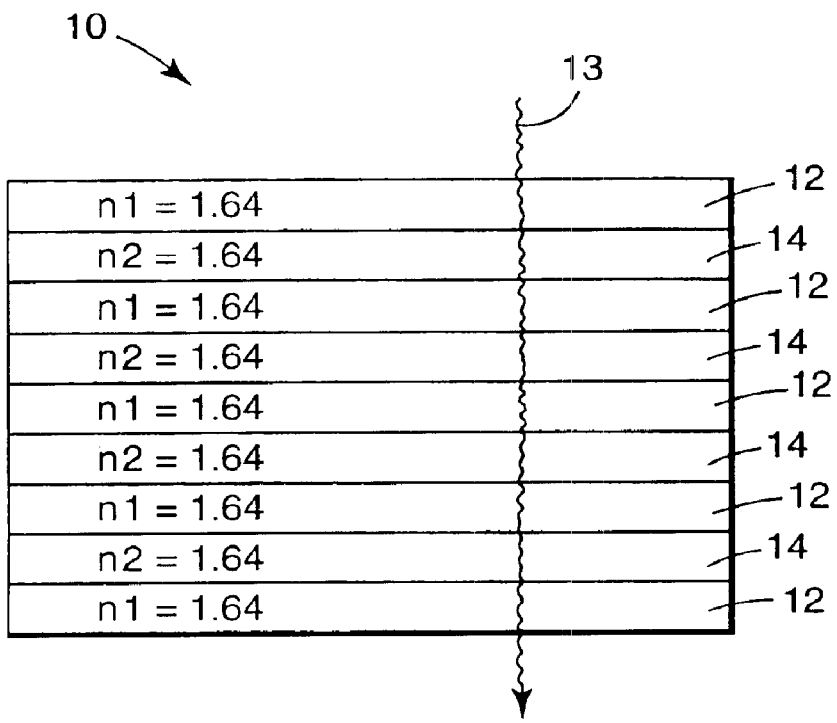
FIGS. 1a and 1b are diagrammatical views of the multilayer optical film of the present invention.
Figure 1B:
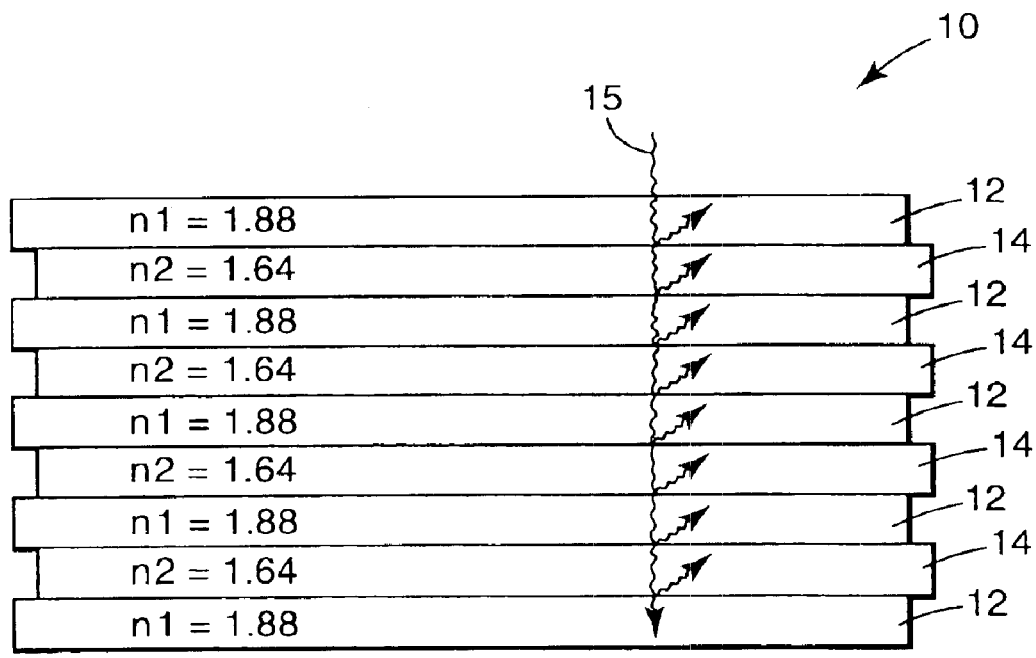

An exemplary multilayer optical film of the present invention as illustrated in FIGS. 1A and 1B includes a multilayer stack 10 having alternating layers of at least two materials 12 and 14. At least one of the materials has the property of stress induced birefringence, such that the index of refraction (n) of the material is affected by the stretching process. FIG. 1A shows an exemplary multilayer stack before the stretching process in which both materials have the same index of refraction. Light ray 13 experiences no index of refraction change and passes through the stack. In FIG. 1B, the same stack has been stretched, thus increasing the index of refraction of material 12. The difference in refractive index at each boundary between layers will cause part of ray 15 to be reflected. By stretching the multilayer stack over a range of uniaxial to biaxial orientation, a film is created with a range of reflectivities for differently oriented plane-polarized incident light. The multilayer stack can thus be made useful as reflective polarizers or mirrors.

Multilayer optical films constructed according to the present invention exhibit a Brewster angle (the angle at which reflectance goes to zero for light incident at any of the layer interfaces) which is very large or is nonexistent. In contrast, known multilayer polymer films exhibit relatively small Brewster angles at layer interfaces, resulting in transmission of light and/or undesirable iridescence. The multilayer optical films according to the present invention, however, allow for the construction of mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

Figure 2:
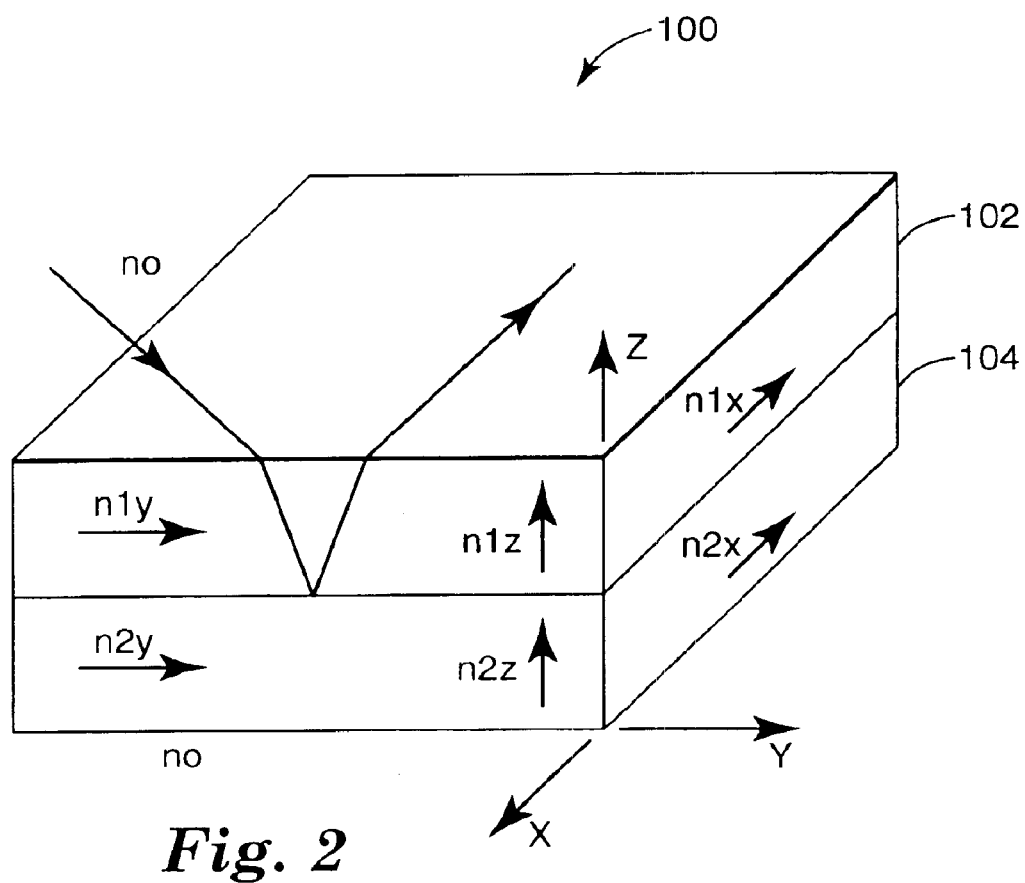
FIG. 2 depicts a two layer stack of films forming a single interface.

FIG. 2 shows two layers of a multilayer stack, and indicates the three dimensional indices of refraction for each layer. The indices of refraction for each layer are n1x, n1y, and n1z for layer 102, and n2x, n2y, and n2z for layer 104. The relationships between the indices of refraction in each film layer to each other and to those of the other layers in the film stack determine the reflectance behavior of the multilayer stack at any angle of incidence, from any azimuthal direction. The principles and design considerations described in U.S. Pat. No. 5,882,774 can be applied to create multilayer stacks having the desired optical effects for a wide variety of circumstances and applications. The indices of refraction of the layers in the multilayer stack can be manipulated and tailored to produce the desired optical properties.

Referring again to FIG. 1B, the multilayer stack 10 can include tens, hundreds or thousands of layers, and each layer can be made from any of a number of different materials. The characteristics which determine the choice of materials for a particular stack depend upon the desired optical performance of the stack. The stack can contain as many materials as there are layers in the stack. For ease of manufacture, preferred optical thin film stacks contain only a few different materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

The preferred multilayer stack is comprised of low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers in the multilayer stack having an average thickness of not more than 0.5 microns.

In those applications where reflective films (e.g. mirrors) are desired, the desired average transmission for light of each polarization and plane of incidence generally depends upon the intended use of the reflective film. One way to produce a multilayer mirror film is to biaxially stretch a multilayer stack which contains a birefringent material as the high index layer of the low/high index pair. For a high efficiency reflective film, average transmission along each stretch direction at normal incidence over the visible spectrum (400–700 nm) is desirably less than 10% (reflectance greater than 90%), preferably less than 5% (reflectance greater than 95%), more preferably less than 2% (reflectance greater than 98%), and even more preferably less than 1% (reflectance greater than 99%). The average transmission at 60 degrees from the normal from 400–700 nm is desirably less than 20% (reflectance greater than 80%), preferably less than 10% (reflectance greater than 90%), more preferably less than 5% (reflectance greater than 95%), and even more preferably less than 2% (reflectance greater than 98%), and even more preferably less than 1% (reflectance greater than 99%).

In addition, asymmetric reflective films may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400–700 nm), or over the visible spectrum and into the near infrared (e.g, 400–850 nm).

Multilayer optical films can also be designed to operate as reflective polarizers. One way to produce a multilayer reflective polarizer is to uniaxially stretch a multilayer stack which contains a birefringent material as the high index layer of the low/high index pair. The resulting reflective polarizers have high reflectivity for light with its plane of polarization parallel to one axis (in the stretch direction) for a broad range of angles of incidence, and simultaneously have low reflectivity and high transmissivity for light with its plane of polarization parallel to the other axis (in the non-stretch direction) for a broad range of angles of incidence. By controlling the three indices of refraction of each film, nx, ny and nz, the desired polarizer behavior can be obtained.

For many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest.

The average transmission at normal incidence for a polarizer in the transmission axis across the visible spectrum (400–700 nm for a bandwidth of 300 nm) is desirably at least 50%, preferably at least 70%, more preferably at least 85% and even more preferably at least 90%. The average transmission at 60 degrees from the normal (measured along the transmission axis for p-polarized light) for a polarizer from 400–700 nm is desirably at least 50%, preferably at least 70%, more preferably at least 80%, and even more preferably at least 90%.

The average transmission for a multilayer reflective polarizer at normal incidence for light polarized in the direction of the extinction axis across the visible spectrum (400–700 nm for a bandwidth of 300 nm) is desirably at less than 50%, preferably less than 30%, more preferably less than 15%, and even more preferably less than 5%. The average transmission at 60 degrees from the normal (measured along the transmission axis for p-polarized light) for a polarizer for light polarized in the direction of the extinction axis from 400–700 nm is desirably less than 50%, preferably less than 30%, more preferably less than 15%, and even more preferably less than 5%.

For certain applications, high reflectivity for p-polarized light with its plane of polarization parallel to the transmission axis at off-normal angles are preferred. The average reflectivity for light polarized along the transmission axis should be more than 20% at an angle of at least 30 degrees from the normal.

In addition, although reflective polarizing films and asymmetric reflective films are discussed separately herein, it should be understood that two or more of such films could be provided to reflect substantially all light incident on them (provided they are properly oriented with respect to each other to do so). This construction is typically desired when the multilayer optical film is used as a reflector in a backlight system according to the present invention.

If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. The % RMS color, $C_{RMS}$, can be determined according to the equation:

$$C_{RMS} = \frac{\int_{\lambda 1}^{\lambda 2} ((T-\overline{T})^2)^{1/2} d\lambda}{\overline{T}(\lambda 2 - \lambda 1)}$$

where the range λ1 to λ2 is the wavelength range, or bandwidth, of interest, T is the transmissivity along the transmission axis, and $\overline{T}$ is the average transmissivity along the transmission axis in the wavelength range of interest. For applications where a low color polarizer is desirable, the % RMS color should be less than 10%, preferably less than 8%, more preferably less than 3.5%, and even more preferably less than 2% at an angle of at least 30 degrees from the normal, preferably at least 45 degrees from the normal, and even more preferably at least 60 degrees from the normal.

Preferably, a reflective polarizer combines the desired % RMS color along the transmission axis for the particular application with the desired amount of reflectivity along the extinction axis across the bandwidth of interest. For polarizers having a bandwidth in the visible range (400–700 nm, or a bandwidth of 300 nm), average transmission along the extinction axis at normal incidence is desirably less than 40%, more desirably less than 25%, preferably less than 15%, more preferably less than 5% and even more preferably less than 3%.

Materials Selection and Processing

With the design considerations described in the above mentioned U.S. Pat. No. 5,882,774, one of ordinary skill will readily appreciate that a wide variety of materials can be used to form multilayer reflective films or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite of the first material. Or, the second material may have no birefringence, or less birefringence than the first material.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethylene terephthalate), polyimides (e.g., polyacrylic imides), polyetherimides, atactic polystyrene, polycarbonates, polymethacrylates (e.g., polyisobutyl methacrylate, polypropylmethacrylate, polyethylmethacrylate, and polymethylmethacrylate), polyacrylates (e.g., polybutylacrylate and polymethylacrylate), syndiotactic polystyrene (sPS), syndiotactic poly-alpha-methyl styrene, syndiotactic polydichlorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroethylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastomers (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of terephthalic acid, or esters thereof, with (a) naphthalene dicarboxylic acid, or esters thereof; (b) isophthalic acid, or esters thereof; (c) phthalic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

Particularly preferred combinations of layers in the case of polarizers include PEN/co-PEN, polyethylene terephthalate (PET)/co-PEN, PEN/sPS, PET/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co.

Particularly preferred combinations of layers in the case of reflective films include PET/Ecdel, PEN/Ecdel, PEN/sPS, PEN/THV, PEN/co-PET, and PET/sPS, where "co-PET" refers to a copolymer or blend based upon terephthalic acid (as described above), Ecdel is a thermoplastic polyester commercially available from Eastman Chemical Co., and THV is a fluoropolymer commercially available from Minnesota Mining and Manufacturing Company, St. Paul, Minn.

The number of layers in the film is selected to achieve the desired optical properties using the minimum number of layers for reasons of film thickness, flexibility and economy. In the case of both polarizers and reflective films, the number of layers is preferably less than 10,000, more preferably less than 5,000, and even more preferably less than 2,000.

As discussed above, the ability to achieve the desired relationships among the various indices of refraction (and thus the optical properties of the multilayer film) is influenced by the processing conditions used to prepare the multilayer film. In the case of organic polymers which can be oriented by stretching, the films are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of reflective films the film is stretched substantially in two directions (biaxial orientation).

The film may be allowed to dimensionally relax in the cross-stretch direction from the natural reduction in cross-stretch (equal to the square root of the stretch ratio); it may simply be constrained to limit any substantial change in cross-stretch dimension; or it may be actively stretched in the cross-stretch dimension. The film may be stretched in the machine direction, as with a length orienter, or in width using a tenter.

The pre-stretch temperature, stretch temperature, stretch rate, stretch ratio, heat set temperature, heat set time, heat set relaxation, and cross-stretch relaxation are selected to yield a multilayer film having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer film. In general, however, a stretch ratios in the range from 1:2 to 1:10 (more preferably 1:3 to 1:7) in the stretch direction and from 1:0.2 to 1:10 (more preferably from 1:0.3 to 1:7) orthogonal to the stretch direction is preferred.

Suitable multilayer films may also be prepared using techniques such as spin coating (e.g., as described in Boese et al., J. Polym. Sci.: Part B, 30:1321 (1992)) for birefringent polyimides, and vacuum deposition (e.g., as described by Zang et. al., Appl. Phys. Letters, 59:823 (1991)) for crystalline organic compounds; the latter technique is particularly useful for certain combinations of crystalline organic compounds and inorganic materials.

Exemplary multilayer reflective mirror films and multilayer reflective polarizers will now be described in the following examples.

EXAMPLE 1

PEN:THV 500, 449, Mirror

A coextruded film containing 449 layers was made by extruding the cast web in one operation and later orienting the film in a laboratory film-stretching apparatus. A Polyethylene naphthalate (PEN), with an Intrinsic Viscosity of 0.53 dl/g (60 wt. % phenol/40 wt. % dichlorobenzene) was delivered by one extruder at a rate of 56 pounds per hour and THV 500 (a fluoropolymer available from Minnesota Mining and Manufacturing Company) was delivered by another extruder at a rate of 11 pounds per hour. The PEN was on the skin layers and 50% of the PEN was present in the two skin layers. The feedblock method was used to generate 57 layers which was passed through three multipliers producing an extrudate of 449 layers. The cast web was 20 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 140° C. in 60 seconds. Stretching then commenced at 10%/sec (based on original dimensions) until the sample was stretched to about 3.5×3.5. Immediately after the stretching the sample was cooled by blowing room temperature air at it.

Figure 3:
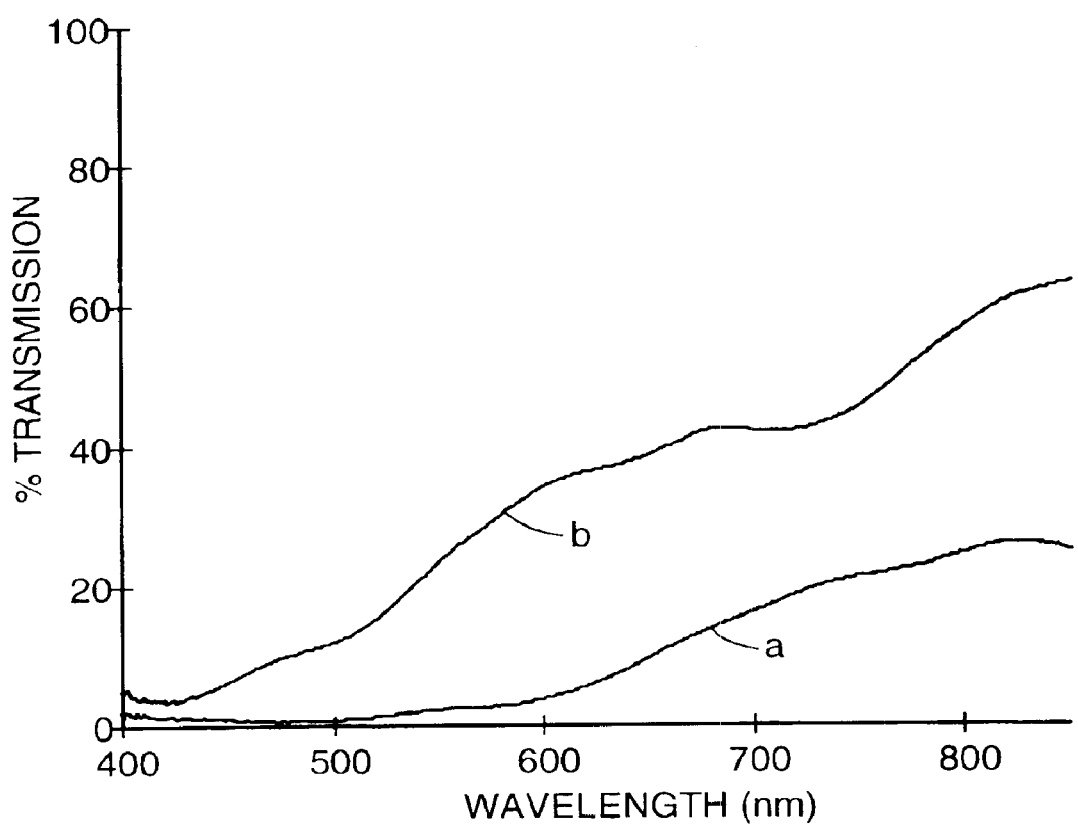
FIGS. 3–6, 7A and 7B depict the optical performance of multilayer optical films described in Examples 1–5.

FIG. 3 shows the transmission of this multilayer film. Curve (a) shows the response at normal incidence, while curve (b) shows the response at 60 degrees for p-polarized light.

EXAMPLE 2

PEN:PMMA, 601, Mirror

A coextruded film containing 601 layers was made on a sequential flat-film-making line via a coextrusion process. Polyethylene Naphthalate (PEN) with an Intrinsic Viscosity of 0.57 dl/g (60 wt. % phenol/40 wt. % dichlorobenzene) was delivered by extruder A at a rate of 114 pounds per hour with 64 pounds per hour going to the feedblock and the rest going to skin layers described below. PMMA (CP-82 from ICI of Americas) was delivered by extruder B at a rate of 61 pounds per hour with all of it going to the feedblock. PEN was on the skin layers of the feedblock. The feedblock method was used to generate 151 layers using the feedblock such as those described in U.S. Pat. No. 3,801,429, after the feedblock two symmetric skin layers were coextruded using extruder C metering about 30 pounds per hour of the same type of PEN delivered by extruder A. This extrudate passed through two multipliers producing an extrudate of about 601 layers. U.S. Pat. No. 3,565,985 describes similar coextrusion multipliers. The extrudate passed through another device that coextruded skin layers at a total rate of 50 pounds per-hour of PEN from extruder A. The web was length oriented to a draw ratio of about 3.2 with the web temperature at about 280° F. The film was subsequently preheated to about 310° F. in about 38 seconds and drawn in the transverse direction to a draw ratio of about 4.5 at a rate of about 11% per second. The film was then heat-set at 440° F. with no relaxation allowed. The finished film thickness was about 3 mil.

Figure 4:
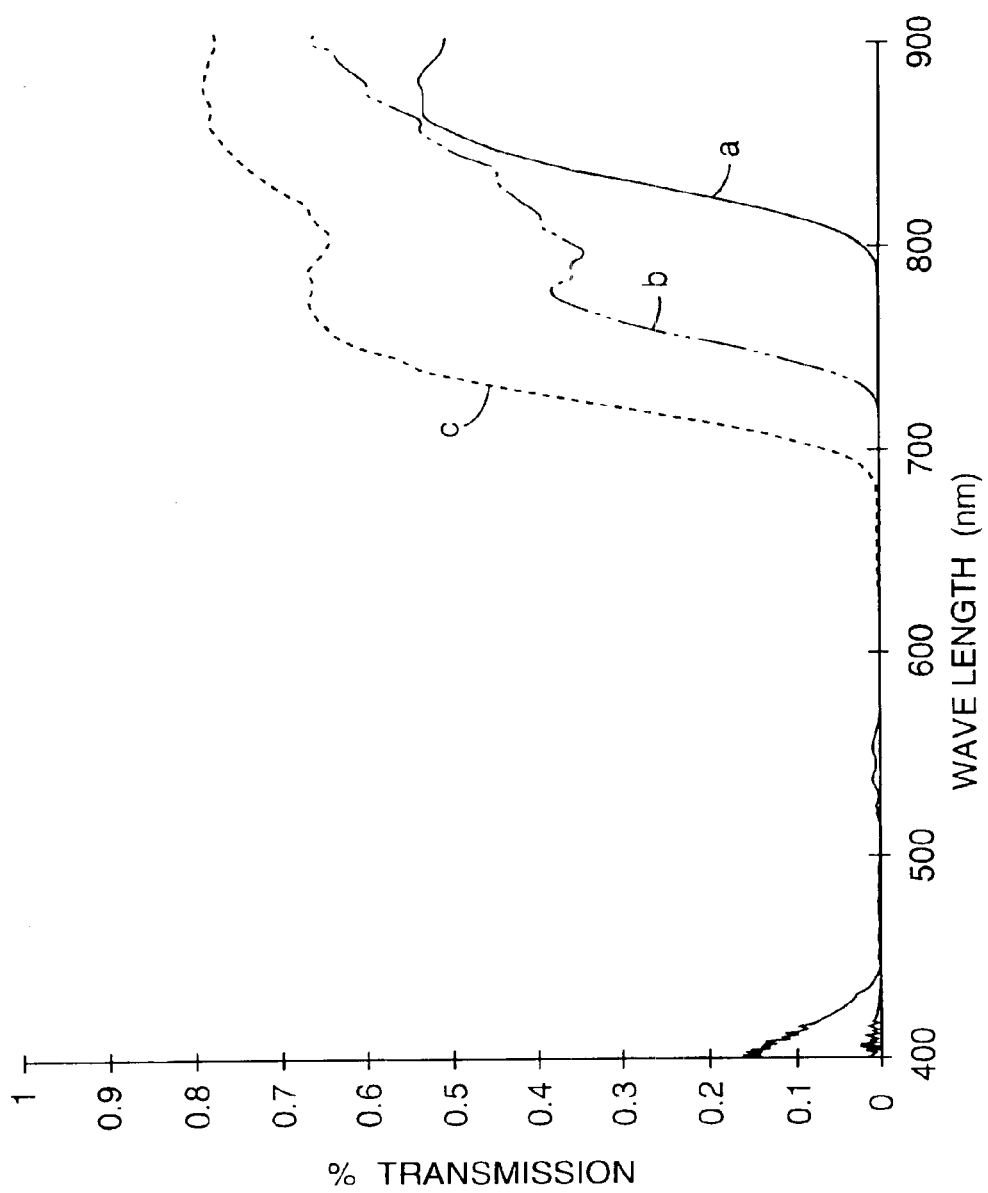

As seen in FIG. 4, curve (a), the bandwidth at normal incidence is about 350 nm with an average in-band extinction of greater than 99%. The amount of optical absorption is difficult to measure because of its low value, but is less than 1%. At an incidence angle of 50° from the normal both s (curve (b)) and p-polarized (curve (c)) light showed similar extinctions, and the bands were shifted to shorter wavelengths as expected. The red band-edge for s-polarized light is not shifted to the blue as much as for p-polarized light due to the expected larger bandwidth for s-polarized light, an due to the lower index seen by the p-polarized light in the PEN layers.

EXAMPLE 3

PEN:PCTG, 449, Polarizer

A coextruded film containing 481 layers was made by extruding the cast web in one operation and later orienting the film in a laboratory film-stretching apparatus. The feedblock method was used with a 61 layer feedblock and three (2×) multipliers. Thick skin layers were added between the final multiplier and the die. Polyethylene naphthalate (PEN) with an intrinsic viscosity of 0.47 dl/g (60 wt. % phenol/40 wt. % dichlorobenzene) was delivered to the feedblock by one extruder at a rate of 25.0 pounds per hour. Glycol modified polyethylene dimethyl cyclohexane terephthalate (PCTG 5445 from Eastman) was delivered by another extruder at a rate of 25.0 pounds per hour. Another stream of PEN from the above extruder was added as skin layers after the multipliers at a rate of 25.0 pounds per hour. The cast web was 0.007 inches thick and 12 inches wide. The web was layer uniaxially oriented using a laboratory stretching device that uses a pantograph to grip a section of film and stretch it in one direction at a uniform rate while it is allowed to freely relax in the other direction. The sample of web loaded was about 5.40 cm wide (the unconstrained direction) and 7.45 cm long between the grippers of the pantograph. The web was loaded into the stretcher at about 100° C. and heated to 135° C. for 45 seconds. Stretching was then commenced at 20%/second (based on original dimensions) until the sample was stretched to about 6:1 (based on gripper to gripper measurements). Immediately after stretching, the sample was cooled by blowing room temperature air at it. In the center, the sample was found to relax by a factor of 2.0.

Figure 5:
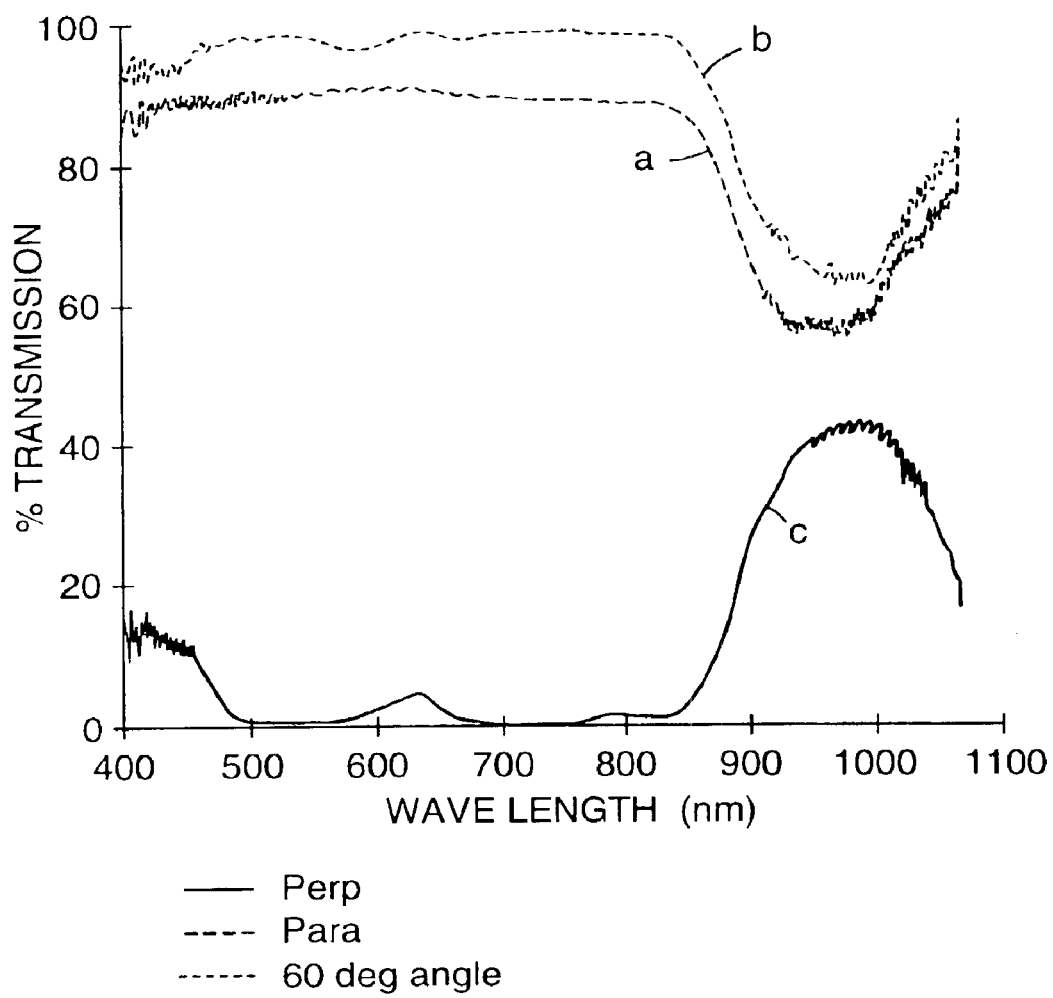

FIG. 5 shows the transmission of this multilayer film where curve a shows transmission of light polarized in the non-stretch direction at normal incidence, curve b shows transmission of p-polarized light polarized in the non-stretched direction at 60° incidence, and curve c shows the transmission of light polarized in the stretch direction at normal incidence. Average transmission for curve a from 400–700 nm is 89.7%, average transmission for curve b from 400–700 nm is 96.9%, and average transmission for curve c from 400–700 nm is 4.0%. % RMS color for curve a is 1.05%, and % RMS color for curve b is 1.44%.

EXAMPLE 4

PEN:CoPEN, 601, Polarizer

A coextruded film containing 601 layers was made on a sequential flat-film-making line via a coextrusion process. A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene dicarboxylate methyl ester, 15% dimethyl isophthalate and 15% dimethyl terephthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. The PEN skin layers were coextruded on the outside of the optical stack with a total thickness of 8% of the coextruded layers. The optical stack was multiplied by two sequential multipliers. The nominal multiplication ratio of the multipliers were 1.2 and 1.27, respectively. The film was subsequently preheated to 310° F. in about 40 seconds and drawn in the transverse direction to a draw ratio of about 5.0 at a rate of 6% per second. The finished film thickness was about 2 mils.

Figure 6:
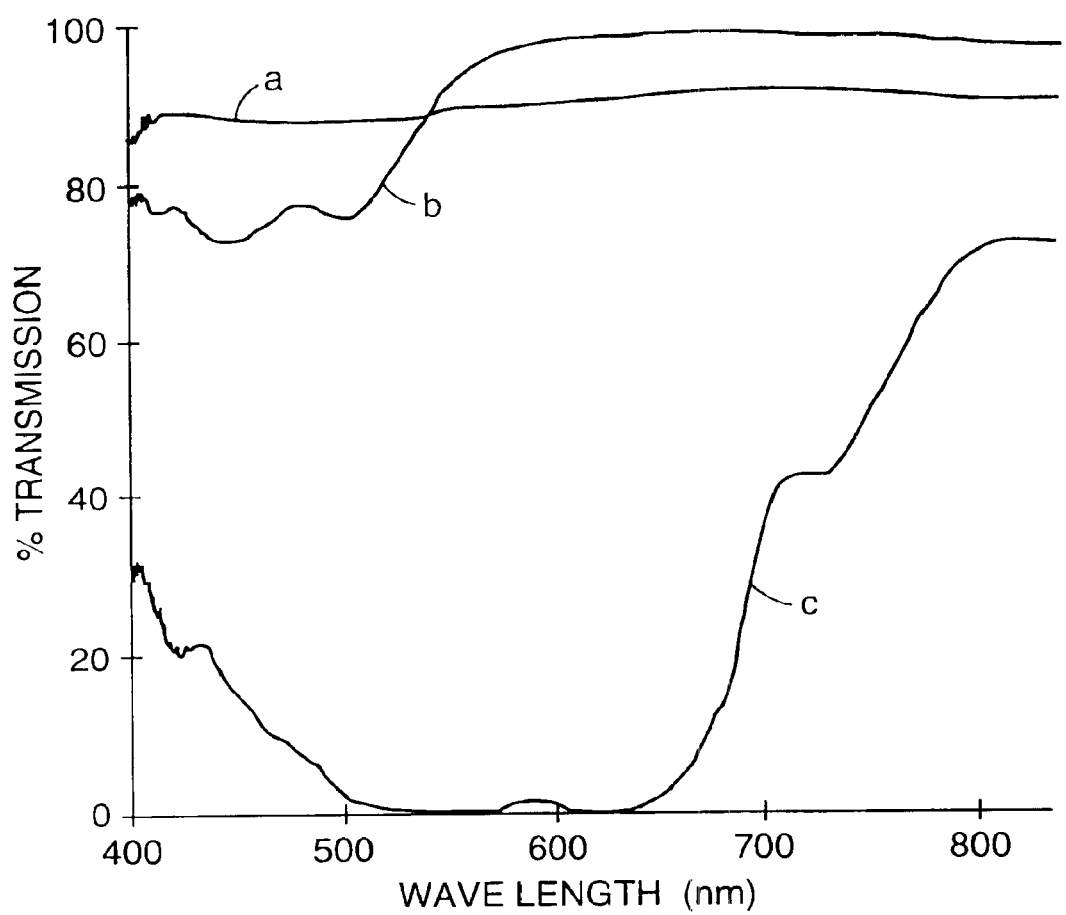

FIG. 6 shows the transmission for this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light in the non-stretch direction at both normal and 60° incidence (80–100%). Also note the very high reflectance of light polarized in the stretched direction in the visible range (400–700 nm) shown by curve c. Reflectance is nearly 99% between 500 and 650 nm.

EXAMPLE 5

PEN:sPS, 481, Polarizer

A 481 layer multilayer film was made from a polyethylene naphthalate (PEN) with an intrinsic viscosity of 0.56 dl/g measured in 60 wt. % phenol and 40 wt % dichlorobenzene purchased from Eastman Chemicals and a syndiotactic polystyrene (sPS) homopolymer (weight average molecular weight=200,000 Daltons, sampled from Dow Corporation). The PEN was on the outer layers and was extruded at 26 pounds per hour and the sPS at 23 pounds per hour. The feedblock used produced 61 layers with each of the 61 being approximately the same thickness. After the feedblock three (2×) multipliers were used. Equal thickness skin layers containing the same PEN fed to the feedblock were added after the final multiplier at a total rate of 22 pounds per hour. The web was extruded through a 12" wide die to a thickness of about 0.011 inches (0.276 mm). The extrusion temperature was 290° C.

This web was stored at ambient conditions for nine days and then uniaxially oriented on a tenter. The film was preheated to about 320° F. (160° C.) in about 25 seconds and drawn in the transverse direction to a draw ratio of about 6:1 at a rate of about 28% per second. No relaxation was allowed in the stretched direction. The finished film thickness was about 0.0018 inches (0.046 mm).

Figure 7A:
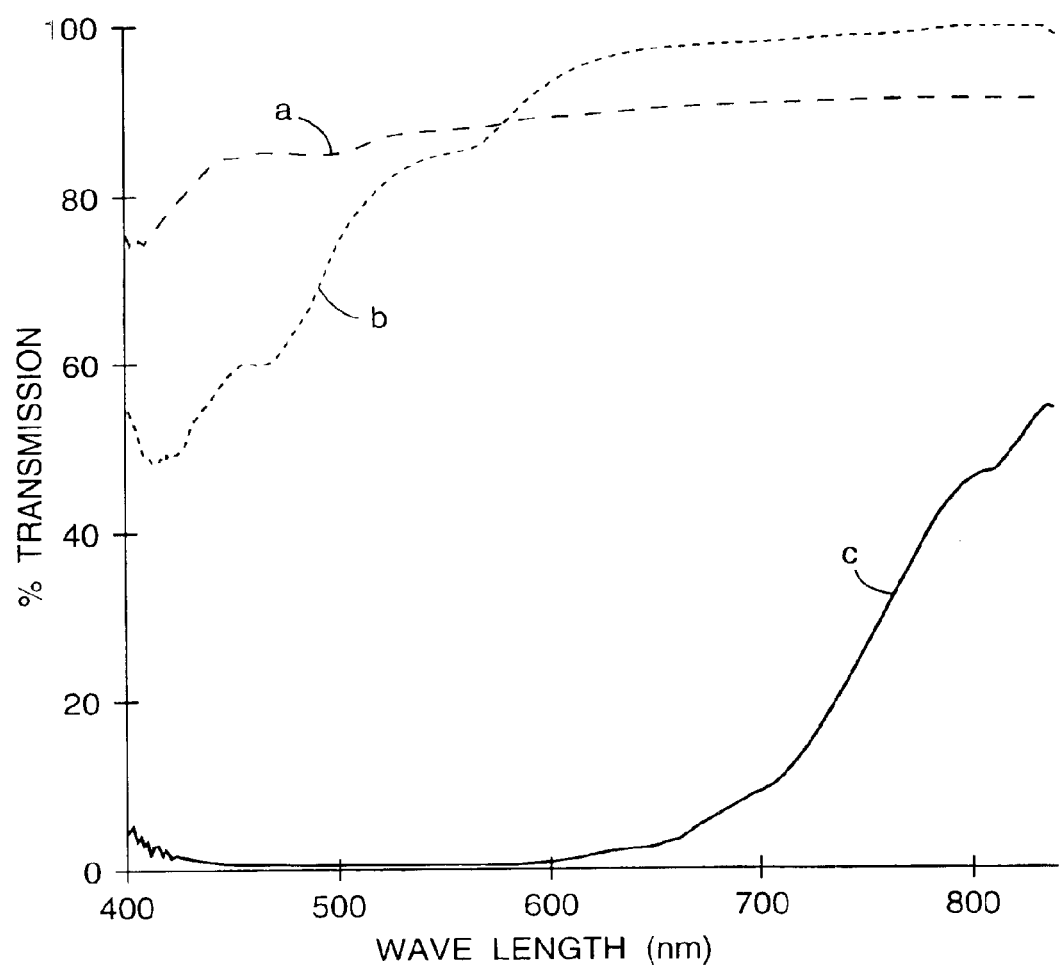

FIG. 7 shows the optical performance of this PEN:sPS reflective polarizer containing 481 layers. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence. Average transmission for curve a over 400–700 nm is 86.2%, the average transmission for curve b over 400–700 nm is 79.7%. Also note the very high reflectance of light polarized in the stretched direction in the visible range (400–700 nm) shown by curve c. The film has an average transmission of 1.6% for curve c between 400 and 700 nm. The % RMS color for curve a is 3.2%, while the % RMS color for curve b is 18.2%.

EXAMPLE 6

PEN:coPEN, 603, Polarizer

A reflecting polarizer comprising 603 layers was made on a sequential flat-film making line via a coextrusion process. A polyethylene naphthalate (PEN) with an intrinsic viscosity of 0.47 dl/g (in 60 wt % phenol plus 40 wt % dichlorobenzene) was delivered by an extruder at a rate of 83 pounds (38 kg) per hour and the CoPEN was delivered by another extruder at 75 pounds (34 kg) per hour. The CoPEN was a copolymer of 70 mole %, 2,6 naphthalene dicarboxylate methyl ester, 15 mole % dimethyl terephthalate, and 15 mole % dimethyl isophthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. This optical stack was multiplied by two sequential multipliers. The nominal multiplication ratio of the multipliers was 1.2 and 1.4, respectively. Between the final multiplier and the die, skin layers were added composed of the same CoPEN described above, delivered by a third extruder at a total rate of 106 pounds (48 kg) per hour. The film was subsequently preheated to 300° F. (150° C.) in about 30 seconds and drawn in the transverse direction to a draw ratio of approximately 6 at an initial rate of about 20% per second. The finished film thickness was approximately 0.0035 inch (0.089 mm).

Figure 7B:
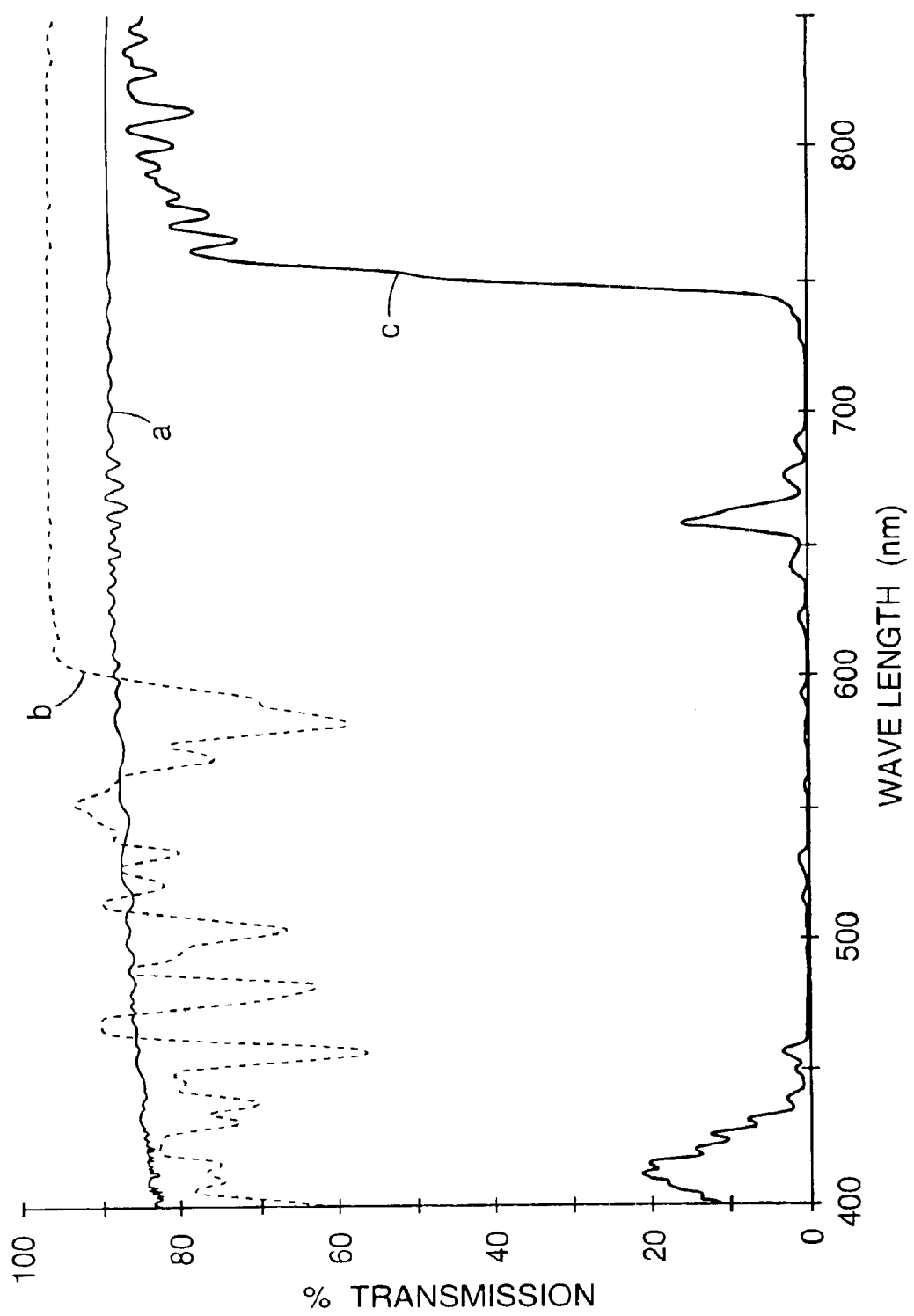

FIG. 7B shows the optical performance of the polarizer of Example 6. Curve a shows transmission of light polarized in the non-stretch direction at normal incidence, curve b shows transmission of p-polarized light in the nonstretch direciton at 50 degree angle of incidence, and curve c shows transmission of light polarized in the stretch direction at normal incidence. Note the very high transmission of light polarized in the non-stretch direction. Average transmission for curve a over 400–700 nm is 87%. Also note the very high reflectance of light polarized in the stretched direction in the visible range (400–700 nm) shown by curve c. The film has an average transmission of 2.5% for curve c between 400 and 700 nm. The % RMS color for curve b is 5%.

II. Optical Devices Using Multilayer Optical Films

Figure 8:
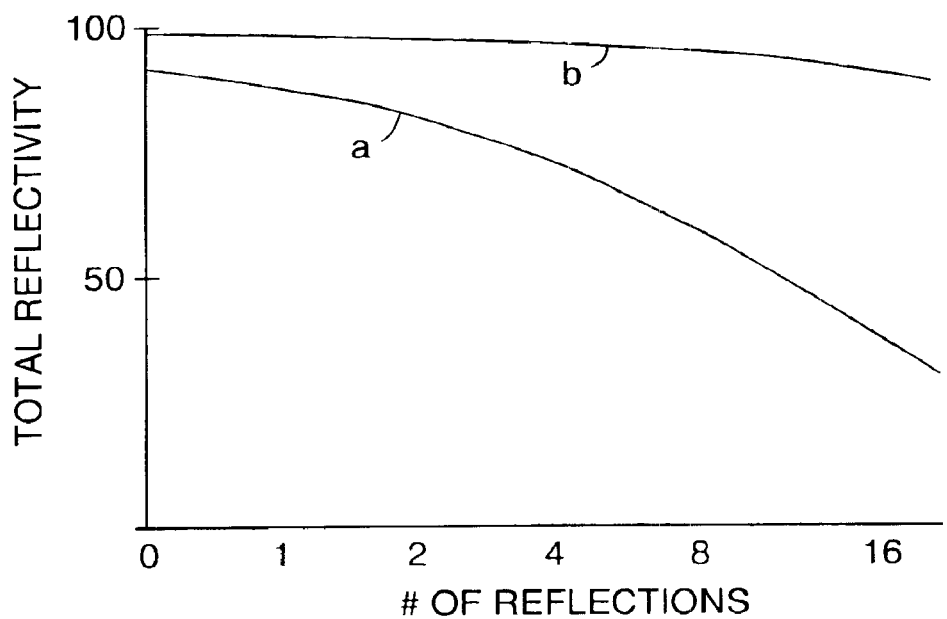
FIG. 8 is a graphical representation illustrating the relationship between the number of reflections experienced by a ray of light (x-axis) as compared to the relative intensity of the light ray (y-axis) for reflective surfaces made of multilayer optical film and a standard reflector.

Optical devices according to the present invention use multilayer optical films to polarize and/or reflect light. The advantages of using multilayer optical film in optical devices involving reflection of light are graphically illustrated in FIG. 8. Curve a shows the total reflectivity as a function of the number of reflections for convention reflector that has 96% reflectivity (i.e., about 4% of the light is absorbed at each reflection). As shown by curve a, the intensity of light which has been reflected decreases significantly after a relatively low number of reflections when the surface reflecting the light absorbs only about 4% of the light. In contrast, curve b shows the total reflectivity for a multilayer mirror film having a reflectivity of about 99.4%. Curve b clearly shows a much smaller decrease in total reflectivity. The difference becomes especially pronounced after only 24 reflections.

For example, for five reflections, the intensity of light is about 97% for light reflected from multilayer optical films according to the present invention, while the intensity drops to about 81.5% for light reflected from a conventional reflector which is only about 3.5% less efficient. Although it is difficult to determine the average number of reflections experienced by light in a backlight system, the number of reflections can be expected to increase as aspect ratio (defined more completely below) increase in any given backlight system. Those increased reflections would cause a significant loss in efficiency for backlight systems using conventional reflectors which would not be experienced in backlight systems employing multilayer optical film reflectors according to the present invention.

The practical value of this characteristic is that the efficiency of the present optical device is greatly enhanced as compared to systems employing conventional reflectors. Stated another way, the number of acceptable reflections for a given light ray in optical devices employing multilayer optical film according to the present invention can be significantly increased without substantially impairing the overall output of the device as compared to optical devices employing known reflectors/polarizers. This means that the present optical devices can be used to transmit and transport light over greater distances with better efficiency than presently known conventional reflectors.

Optical devices which incorporate the multilayer optical film can be most generally described as devices in which at least a portion of the light entering and/or exiting the device is reflected from an optical surface comprising the multilayer optical film. For the purpose of this invention, an "optical surface" will be defined as a surface, planar or otherwise, which reflects at least a portion of randomly polarized light incident upon it. More preferably, at least a portion of the light traveling through the optical devices will be reflected from an optical surface more than once, thereby exploiting the advantages of the multilayer optical film.

A subset of optical devices incorporating multilayer optical film according to the present invention will comprise two or more optical surfaces and can generally be categorized into devices in which the optical surfaces are arranged in a parallel or a non-parallel opposing arrangement.

Optical devices with substantially parallel optical surfaces include, but are not limited to: light pipes, light boxes, rectangular light guides, etc. For those devices designed to transmit light from one location to another, such as a light pipe, it is desirable that the optical surfaces absorb and transmit a minimal amount of light incident upon them while reflecting substantially all of the light. In other devices such as light boxes and light guides, it may be desirable to deliver light to a selected area using generally reflective optical surfaces and to then allow for transmission of light out of the device in a known, predetermined manner. In such devices, it may be desirable to provide a portion of the optical surface as partially reflective to allow light to exit the device in a predetermined manner. Examples of such devices will be described more completely below.

Another class of optical devices which include two or more reflective optical surfaces are devices in which the reflective optical surfaces converge towards each other as distance from a light source (or point of entry into the device) increases. This construction is especially useful in optical devices where it is desired to return light emitted from an optical source towards the direction from which the light entered the device. Optical devices with converging reflective optical surfaces will typically reflect a majority of light in a direction generally towards the source of the light.

Yet another class of optical devices which include two or more optical surfaces are devices in which the reflective optical surfaces diverge as distance from a light source (or point of entry into the device) increases. Optical devices with diverging reflective optical surfaces will typically tend to collimate light. The amount and degree of collimation will depend on the location of the light source relative to the narrow end of the device and the rate of divergence of the multilayer reflective optical film surfaces.

In a preferred embodiment, the optical devices are hollow as this will tend to decrease the amount of absorption at each reflection as light is transported by the optical devices.

In the effort to direct light towards a specific target, such as in task lighting, solar collectors, or otherwise, it may be preferred that the diverging optical surfaces form a parabola or cone. If a parabolic shape is used, collimation is best accomplished for light passing through or emanating from the focal point of the parabola. The specifics of designing the shape of such devices will be well known to those skilled in the art and will not be discussed herein.

Figure 9:
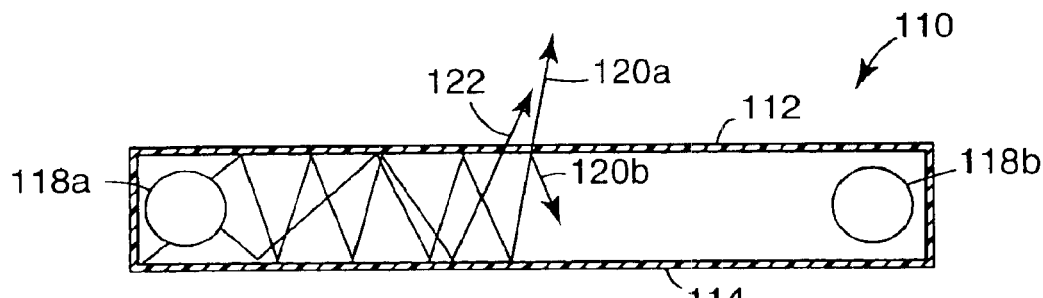
FIG. 9 is schematic cross-sectional diagram of an alternate optical device according to the present invention.
Figure 10:
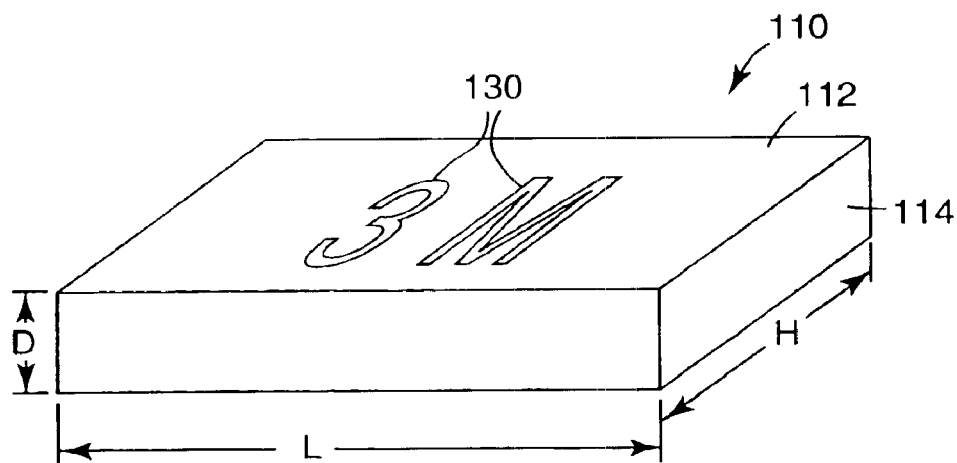
FIG. 10 is a perspective view of the optical device of FIG. 9 in which at least one surface of the device is intended to display a message.

Turning now to the figures in which illustrative examples of optical devices according to the present invention are depicted, FIGS. 9 and 10 depict one illustrative optical device 110 in a cross-sectional schematic view in FIG. 9 and a perspective view in FIG. 10. Optical device 110 is commonly referred to as a light box and can be substantially rectangular as shown or it can take any other shape desired based on aesthetics or functional considerations. Light boxes are typically substantially enclosed volumes in which one or more light sources are located. The volume is preferably lined with a reflective surface and includes either partially reflective areas or voids which allow light to escape from the light box in a predetermined pattern or manner.

The illustrative light box 110 depicted in FIGS. 9 and 10 includes at least two opposing reflective and/or partially reflective optical surfaces 112 and 114 comprised of the multilayer optical film. It is most preferred that all of the interior reflective surfaces of the light box 110 are covered by the multilayer optical film. By using the multilayer optical film according to the present invention for all of the reflective surfaces within the light box 110, absorption losses can be greatly reduced as compared to devices using conventional reflectors and/or polarizers. In some instances, however, all or a portion of either or both optical surfaces 112 and 114 can be constructed from other materials.

Where multilayer optical film is used in any optical device, it will be understood that it can be laminated to a support (which itself may be transparent, opaque reflective or any combination thereof) or it can be otherwise supported using any suitable frame or other support structure because in some instances the multilayer optical film itself may not be rigid enough to be self-supporting in an optical device such as illustrative device 110.

The optical device 110 illustrated in FIG. 9 includes two light sources 118a and 118b, referred to commonly as 118, which emit light into the interior of the device 110. Light emitted from the sources 118 will typically reflect between surfaces 112 and 114 numerous times before exiting the device 110 through a partially reflective area or transmissive void located in surface 112, denoted by reference number 130 in FIG. 10.

For illustration purposes, light rays 120 and 122 are shown as emanating from source 118a and reflecting within the optical device 110 until they exit from areas such as 130 in layer 112. In an illuminated sign depicted as the illustrative optical device 110, areas 130 will typically comprise advertising or other informational messages or, alternatively, may comprise a decorative display of some type. Although only areas 130 are depicted as transmitting light through optical surface 112, it will be understood that all or any portion of both surfaces 112 and 114 may transmit light out of device 110.

Areas 130 which transmit light can be provided of many different materials or constructions. The areas 130 can be made of multilayer optical film or any other transmissive or partially transmissive materials. One way to allow for light transmission through areas 130 is to provide areas in optical surface 112 which are partially reflective and partially transmissive. Partial reflectivity can be imparted to multilayer optical films in areas 130 according to the present invention by a variety of means.

In one aspect, areas 130 may comprise multi-layered optical film which is uniaxially stretched to allow transmission of light having one plane of polarization while reflecting light having a plane of polarization orthogonal to the transmitted light. Rays 120a and 120b of light as depicted in FIG. 9 illustrate such a situation in which light having one polarization direction is transmitted through multi-layered optical film 130 while light having the orthogonal polarization direction is reflected back into optical device 110.

When areas 130 are provided from a multilayer reflective polarizing film, it is preferable that the optical device 110 include some mechanism for randomizing polarization orientation of the light reflected back into the interior of the device 110. One mechanism for randomizing polarization orientation would be to provide a thin pigmented coating on optical surface 114 to randomize polarization and scatter light reflected from the areas 130. Another mechanism is to add a birefringent polymer film, or to have a birefringent skin layer on the MOF mirror. Any mechanism, however, by which the polarization orientation of returned light 120b can be modified after reflection from the reflective polarizing areas 130 is desirable as it can then be returned to areas 130 and, theoretically, a portion of the light will then have the proper polarization orientation to allow transmission through areas 130 and out of optical device 110.

Light ray 122 depicts the effect of an alternate means of providing for transmission of light through areas 130 in an optical device 110 according to the present invention. Light ray 122 is transmitted through areas 130 without reflection through a void formed in the optical surface 112. As a result, there is no partial reflection of light ray 122 as opposed to light ray 120 as described above. In this situation, optical surface 112 is itself substantially completely reflective, except for those voids in areas 130 which transmit light without substantial reflection.

It will be understood that the term "void" can be used to describe an actual physical aperture through optical surface 112 as well as clear or transparent areas formed in the optical surface 112 which do not substantially reflect light. The number and size of multiple apertures in area 130 of optical surface 112 may be varied to control the amount of light transmitted through the areas 130. At one extreme, areas 130 may even constitute complete voids in optical surface 112, although large voids are typically undesirable to protect the interior of the device 110 from debris, dust, etc.

An alternate embodiment of an optical device 110 can be provided where at least the areas 130 in optical surface 112 do not comprise a multilayer optical film at all, but rather comprise a different class of partially reflective films, such as a structured partially reflective film. Exemplary microreplicated structured partially reflective films are marketed as Optical Lighting Film, and Brightness Enhancement Film, available from Minnesota Mining and Manufacturing Company, St. Paul, Minn.

In those instances where a less efficient multilayer optical film is used (i.e., some of the light incident upon the multilayer optical film surfaces is lost through transmission), it may be advantageous to provide the back surfaces of the multilayer optical film, i.e., the surface facing the exterior of the device 110, with a thin metal or other reflective coating to reflect light that would otherwise be lost to transmission, thereby improving the reflectivity of the multilayer optical film. It will of course, be understood that the metallic or other reflective coating may suffer from some absorption losses, but the fraction of light transmitted through the film will typically be less than 5% (more preferably less than 1%) of the total light incident on the film. The metallic or other reflective coating may also be useful to reduce visible iridescence if leakage of narrow bands of wavelengths occurs in the multilayer optical film. In general, however, the high efficiency multilayer reflective films are preferred.

Due to the high efficiency of the multilayer optical film in reflecting light in optical devices 110, the number and intensity of light sources 118 needed to provide uniform illumination over the areas 130 can be reduced. Any optical device design can be less concerned about the number of reflections a light ray will make within device 110 before exiting as illustrated in FIG. 10 and described above.

Aspect ratio in a device 110 is typically determined by comparing the depth of the light box, indicated as D in FIG. 10 to the length and height of the device 110, indicated as L and H, respectively. In some instances, aspect ratio may be the ratio of depth D as compared to the area which is defined by the length times the height of optical device 110.

FIG. 11 is a schematic cross-sectional representation of a converging wedge optical device 210, according to the present invention, incorporating multilayer optical film. In any optical device employing a converging wedge design, the optical surfaces 212 and 214 are arranged in a converging relationship in which the optical surfaces converge towards each other as distance from the opening 211 into the device 210 increases. In the preferred embodiment, the surfaces 212 and 214 are comprised of a multilayer optical film. Also, the optical device 210 is preferably hollow to minimize absorption losses.

It will be understood that the optical device 210 could comprise two generally planar optical surfaces 212 and 214. One specific example of a converging wedge design would be a light guide used in a backlight assembly for a liquid crystal display device. Another specific example of an optical device represented in FIG. 11 could comprise a generally conical device having a cross-section taken along the longitudinal axis of the device 210. In a conical device, optical surfaces 212 and 214 may actually be portions of a continuous surface which appears discontinuous due to the cross-sectional nature of the view in FIG. 11.

A light ray 220 is depicted as entering the optical device 210 through opening 211 as shown and is reflected numerous times before exiting in generally the same direction from which it entered the device 210. Optical surfaces 212 and 214 could be comprised of many different materials. For example both surfaces 212 and 214 could be comprised of multilayer optical films according to the present invention and a portion or all of either or both surfaces 212 and 214 could be completely reflective or partially reflective.

If a less efficient multilayer optical film is used for reflective optical surfaces 212 and 214 and it is desired that both surfaces prevent transmission of light, they can be coated on their "exterior" surfaces with a reflective coating such as a thin metallic layer or other reflective coating. That additional layer will help to ensure that layers 212 and 214 do not transmit light. In some instances, however, it may be desirable to provide one or both of the multi-layered optical films 212 and 214 as partially reflective to allow some leakage of light, polarized or not, through surfaces 212 and/or 214 in a uniform or other controlled manner. One specific example of a device 210 where uniform distribution of light is desired is a light guide backlight assembly for a liquid crystal display.

FIG. 12 is a schematic cross-sectional representation of a diverging wedge optical device 310 according to the present invention. In any optical device employing a diverging wedge design, the optical surfaces 312 and 314 are arranged in a diverging relationship in which the surfaces diverge as distance from the light source 318 increases. In a preferred embodiment, the surfaces 312 and 314 are comprised of a multilayer optical film. Also, the optical device 310 is preferably hollow to minimize absorption losses. It will be understood that, like the converging wedge device 210, the diverging wedge depicted in FIG. 12 could comprise two generally planar optical surfaces 312 and 314 or that device 310 could comprise a generally conical, parabolic or other shape in which the depicted cross-section is taken along the longitudinal axis of device 310. In such an optical device, optical surfaces 312 and 314 may actually be portions of a continuous surface which appears discontinuous due to the cross-sectional nature of the view in FIG. 11.

An optical device which includes diverging optical surfaces will tend to collimate light exiting it as light rays 320 and 322 illustrate. The device 310 depicted in FIG. 12 includes a light source 318 located at the entry into device 310. It will, however, be understood that a diverging optical device may include a plurality of sources 318. If device 310 were formed in a roughly parabolic shape, that collimation would be more pronounced if the light source 318 was located proximate the focal point of the parabola. Alternatively, a diverging optical device 310 could also rely on a light generated from a source or sources located away from the actual opening into the diverging optical device 310.

In general, the degree and amount of collimation of light exiting such a device 310 is dependent on a number of factors including the angle of light rays entering the device, the location of the light source, and the shape and/or angular relationship between the optical surfaces 312 and 314.

FIG. 13 is a cross-sectional schematic view of another illustrative optical device 410 formed using the multilayer optical film according to the present invention. The cross-section of device 410 as depicted in FIG. 13 is taken along a longitudinal axis which shows two generally parallel optical surfaces 412 and 414. An additional view is depicted in FIG. 14, which shows a cross-section of device 410 taken transverse to the longitudinal axis. As depicted, device 410 has a generally circular shape.

Optical devices such as device 410 are typically used to transmit light between two locations and are commonly referred to as "light pipes." Such devices have a longitudinal axis and a cross-section transverse to that axis which forms a closed plane figure. Examples of some typical cross-section figures include circles (such as that shown in FIG. 14), ellipses, polygons, closed irregular curves, triangles, squares, rectangles or other polygonal shapes. Any device 410 having a closed plane figure transverse cross-section appears as two surfaces in a longitudinal cross-section as shown in FIG. 13 even though the device 410 may actually be formed from a single continuous optical surface.

Because the multilayer optical film according to the present invention used absorbs substantially none of the light incident upon it, light pipes constructed of multilayer optical film according to the present invention can extend for a relatively large distances without significant loss of throughput.

It is particularly advantageous to use the multilayer optical film with devices such as light pipes in which a large portion of the light travelling through the device approaches the surfaces of the device at shallow angles. Known multilayered polymer reflective films are not efficient at reflecting light approaching them at shallow angles and, therefore, would suffer from large transmissive losses. The present multilayer optical film, however, is able to reflect such light with the much the same efficiency as light approaching the film normal to the surfaces.

Alternately, it will be understood that a device such as light pipe 410 may include sections which are partially transmissive, thus allowing light to escape from the device. The transmission mechanisms may include multilayer reflective polarizing sections, voids or any other mechanism as described with respect to the illustrative embodiments above. Such designs do, however, start to resemble light boxes or guides depicted and described in conjunction with FIGS. 9 and 10, above.

Figure 15:
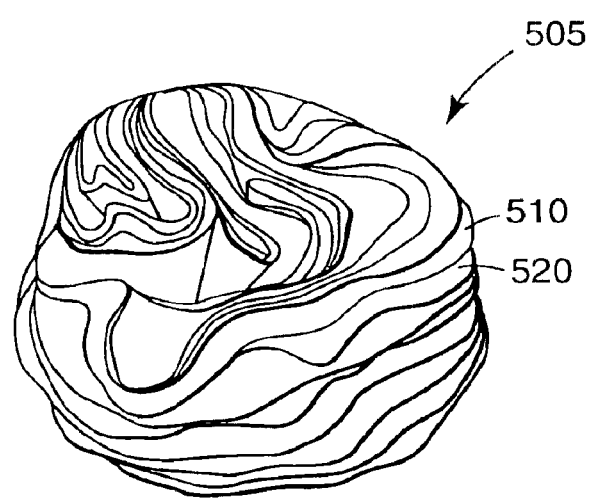
FIG. 15 is a perspective view of one illustrative optical device constructed using multilayer optical films according to the present invention.

FIG. 15 illustrates another optical device according to the present invention. The optical device 505 depicted in FIG. 15 could be used, for example, in a decorative application such as a flower or a bow. Device 505 is constructed of a plurality of multilayer optical film layers (such as layers 510 and 520) connected generally in their centers by a post or some other mechanism. Although the layers are depicted as generally circular, it will be understood that many different shapes could be provided.

The layers can be wrinkled or otherwise manipulated to give the device 505 volume. The wrinkling of multilayer optical film layers also provides device 510 with multiple converging wedges arranged generally vertically to return light incident on the device 505 to a viewer.

Although not required, leakage or transmission of light through the layers of multilayer optical film in device 505 is not a great concern as transmitted light can be reflected out of the device 505 by the adjacent diverging wedge formed by the next layer of film. Because of the adjacent diverging wedges in device 505, it makes highly efficient use of leakage between the vertically arranged converging wedges because light escaping one wedge could be reflected back out of the adjacent wedge into which the light is transmitted. As a result, device 505 has an unusually brilliant appearance.

The multilayer optical film may also be provided in the form of elongated strips. Such strips of film can be advantageously used to form other configurations of optical devices which can be used, for example, as decorative bows, such as any of those described in U.S. Pat. No. 3,637,455 (Pearson et al.); U.S. Pat. No. 4,329,382 (Truskolaski et al.); U.S. Pat. No. 4,476,168 (Aoyama); and U.S. Pat. No. 4,515,837 (Chong); and U.S. Pat. No. 5,468,523 (Huss); and U.S. Pat. No. 5,614,274 (Huss); the entire disclosures of all of which are incorporated herein by reference.

Optical device 505 illustrates another significant advantage of the optical devices incorporating multilayer optical film according to the present invention, i.e., that the devices need not exhibit symmetry to be effective. In fact, optical devices according to the present invention need not exhibit symmetry in any plane or about any line but can still function effectively and efficiently due to the low absorbance and high reflectance both at normal angles and at high angles away from the normal of the multilayer optical films.

Symmetry in optical devices is provided in many instances to reduce or minimize the number of reflections experienced by light travelling through the devices. Minimizing reflections is particularly important when using conventional reflectors because of their relatively high absorptivities (see FIG. 8 and the accompanying description above). Because optical devices using multilayer optical film according to the present invention experience significantly reduced absorption, it is much less important to minimize the number of reflections and, consequently, symmetry is not as important to maintain the efficiency of the optical devices.

As a result, although the illustrative optical devices described above do generally exhibit symmetry about at least one axis, the present invention should not be limited to optical devices having an axis of symmetry. Furthermore, the present invention has been described above with respect to illustrative examples to which modifications may be made without departing from the scope of the invention as defined by the appended claims.

III. Discussion From U.S. Pat. No. 5,882,774 (Jonza et al.)

The present invention as illustrated in FIGS. 1*a* and 1*b* includes a multilayered polymeric sheet 10 having alternating layers of a crystalline naphthalene dicarboxylic acid polyester such as 2,6 polyethylene naphthalate (PEN) 12 and a selected polymer 14 useful as a reflective polarizer or mirror. By stretching PEN/selected polymer over a range of uniaxial to biaxial orientation, a film is created with a range of reflectivities for differently oriented plane-polarized incident light. If stretched biaxially, the sheet can be stretched asymmetrically along orthogonal axes or symmetrically along orthogonal axes to obtain desired polarizing and reflecting properties.

For the polarizer, the sheet is preferably oriented by stretching in a single direction and the index of refraction of the PEN layer exhibits a large difference between incident light rays with the plane of polarization parallel to the oriented and transverse directions. The index of refraction associated with an in-plane axis (an axis parallel to the surface of the film) is the effective index of refraction for plane-polarized incident light whose plane of polarization is parallel to that axis. By oriented direction is meant the direction in which the film is stretched. By transverse direction is meant that direction orthogonal in the plane of the film to the direction in which the film is oriented.

PEN is a preferred material because of its high positive stress optical coefficient and permanent birefringence after stretching, with the refractive index for polarized incident light of 550 nm wavelength increasing when the plane of polarization is parallel to the stretch direction from about 1.64 to as high as about 1.9. The differences in refractive indices associated with different in-plane axes exhibited by PEN and a 70-naphthalate/30-terephthalate copolyester (coPEN) for a 5:1 stretch ratio are illustrated in FIG. 2 of U.S. Pat. No. 5,882,774 (Jonza et al.). In that figure, the data on the lower curve represent the index of refraction of PEN in the transverse direction and the coPEN while the upper curve represents the index of refraction of PEN in the stretch direction. PEN exhibits a difference in refractive index of 0.25 to 0.40 in the visible spectrum. The birefringence (difference in refractive index) can be increased by increasing the molecular orientation. PEN is heat stable from about 155° C. up to about 230° C. depending upon shrinkage requirements of the application. Although PEN has been specifically discussed above as the preferred polymer for the birefringent layer, polybutylene naphthalate is also a suitable material as well as other crystalline naphthalene dicarboxylic polyesters. The crystalline naphthalene dicarboxylic polyester should exhibit a difference in refractive indices associated with different in-plane axes of at least 0.05 and preferably above 0.20.

Minor amounts of comonomers may be substituted into the naphthalene dicarboxylic acid polyester so long as the high refractive index in the stretch direction(s) is not substantially compromised. A drop in refractive index (and therefore decreased reflectivity) may be counter balanced by advantages in any of the following: adhesion to the selected polymer layer, lowered temperature of extrusion, better match of melt viscosities, better match of glass transition temperatures for stretching. Suitable monomers include those based on isophthalic, azelaic, adipic, sebacic, dibenzoic, terephthalic, 2,7-naphthalene icarboxylic, 2,6-naphthalene dicarboxylic or cyclohexanedicarboxylic acids.

The PEN/selected polymer resins of the present invention preferably have similar melt viscosities so as to obtain uniform multilayer coextrusion. The two polymers preferably have a melt viscosity within a factor of 5 at typical shear rates.

The PEN and the preferred selected polymer layers of the present invention exhibit good adhesion properties to each other while still remaining as discrete layers within the multilayered sheet.

The glass transition temperatures of the polymers of the present invention are compatible so adverse effects such as cracking of one set of polymer layers during stretching does not occur. By compatible is meant that the glass transition temperature of the selected polymer is lower than the glass transition temperature of the PEN layer. The glass transition temperature of the selected polymer layer temperature may be slightly higher than the glass transition temperature of the PEN layer, but by no more than 40° C.

Preferably, the layers have a ¼ wavelength thickness with different sets of layers designed to reflect different wavelength ranges. Each layer does not have to be exactly ¼ wavelength thick. The overriding requirement is that the adjacent low-high index film pair have a total optical thickness of 0.5 wavelength. The bandwidth of a 50-layer stack of PEN/coPEN layers having the index differential indicated in FIG. 2 of U.S. Pat. No. 5,882,774 (Jonza et al.), with layer thicknesses chosen to be a ¼ wavelength of 550 nm, is about 50 nm. This 50-layer stack provides roughly a 99 percent average reflectivity in this wavelength range with no measurable absorption. A computer-modeled curve showing less than 1 percent transmission (99 percent reflectivity) is illustrated in FIG. 3 of U.S. Pat. No. 5,882,774 (Jonza et al.). FIGS. 3–8 of that patent include data characterized as percent transmission. It should be understood that since there is no measurable absorbance by the film of the present invention that percent reflectivity is approximated by the following relationship:

100−(percent transmission)=(percent reflectivity).

The preferred selected polymer layer 14 remains isotropic in refractive index and substantially matches the refractive index of the PEN layer associated with the transverse axis as illustrated in FIG. 1a. Light with its plane of polarization in this direction will be predominantly transmitted by the polarizer while light with its plane of polarization in the oriented direction will be reflected as illustrated in FIG. 1b.

The reflective polarizer of the present invention is useful in optical elements such as ophthalmic lenses, mirrors and windows. The polarizer is characterized by a mirror-like look which is considered stylish in sunglasses. In addition, PEN is a very good ultraviolet filter, absorbing ultraviolet efficiently up to the edge of the visible spectrum. The reflective polarizer of the present invention would also be useful as a thin infrared sheet polarizer.

For the polarizer, the PEN/selected polymer layers have at least one axis for which the associated indices of refraction are preferably substantially equal. The match of refractive indices associated with that axis, which typically is the transverse axis, results in substantially no reflection of light in that plane of polarization. The selected polymer layer may also exhibit a decrease in the refractive index associated with the stretch direction. A negative birefringence of the selected polymer has the advantage of increasing the difference between indices of refraction of adjoining layers associated with the orientation axis while the reflection of light with its plane of polarization parallel to the transverse direction is still negligible. Differences between the transverse-axis-associated indices of refraction of adjoining layers after stretching should be less than 0.05 and preferably less than 0.02. Another possibility is that the selected polymer exhibits some positive birefringence due to stretching, but this can be relaxed to match the refractive index of the transverse axis of the PEN layers in a heat treatment. The temperature of this heat treatment should not be so high as to relax the birefringence in the PEN layers.

The preferred selected polymer for the polarizer of the present invention is a copolyester of the reaction product of a naphthalene dicarboxylic acid or its ester such as dimethyl naphthalate ranging from 20 mole percent to 80 mole percent and isophthalic or terephthalic acid or their esters such as dimethyl terephthalate ranging from 20 mole percent to 80 mole percent reacted with ethylene glycol. Other copolyesters within the scope of the present invention have the properties discussed above and have a refractive index associated with the transverse axis of approximately 1.59 to 1.69. Of course, the copolyester must be coextrudable with PEN. Other suitable copolyesters are based on isophthalic, azelaic, adipic, sebacic, dibenzoic, terephthalic, 2,7-naphthalene dicarboxylic, 2,6-naphthalene dicarboxylic or cyclohexanedicarboxylic acids. Other suitable variations in the copolyester include the use of ethylene glycol, propane diol, butane diol, neopentyl glycol, polyethylene glycol, tetramethylene glycol, diethylene glycol, cyclohexanedimethanol, 4-hydroxy diphenol, propane diol, bisphenol A, and 1,8-dihydroxy biphenyl, or 1,3-bis(2-hydroxyethoxy)benzene as the diol reactant. A volume average of the refractive indices of the monomers would be a good guide in preparing useful copolyesters. In addition, copolycarbonates having a glass transition temperature compatible with the glass transition temperature of PEN and with a refractive index associated with the transverse axis of approximately 1.59 to 1.69 are also useful as a selected polymer in the present invention. Formation of the copolyester or copolycarbonate by transesterification of two or more polymers in the extrusion system is another possible route to a viable selected polymer.

To make a mirror, two uniaxially stretched polarizing sheets 10 are positioned with their respective orientation axes rotated 90°, or the sheet 10 is biaxially stretched. In the latter case, both PEN refractive indices in the plane of the sheet increase and the selected polymer should be chosen with as low of a refractive index as possible to reflect light of both planes of polarization. Biaxially stretching the multilayered sheet will result in differences between refractive indices of adjoining layers for planes parallel to both axes thereby resulting in reflection of light in both planes of polarization directions. Biaxially stretching PEN will increase the refractive indices associated with those axes of elongation from 1.64 to only 1.75, compared to the uniaxial value of 1.9. Therefore to create a dielectric mirror with 99 percent reflectivity (and thus with no noticeable iridescence) a low refractive index coPET is preferred as the selected polymer. Optical modeling indicates this is possible with an index of about 1.55. A 300-layer film with a 5 percent standard deviation in layer thickness, designed to cover half of the visible spectrum with six overlapping quarterwave stacks, has the predicted performance shown in FIG. 4. A greater degree of symmetry of stretching yields an article that exhibits relatively more symmetric reflective properties and relatively less polarizing properties.

If desired, two or more sheets of the invention may be used in a composite to increase reflectivity, optical band width, or both. If the optical thicknesses of pairs of layers within the sheets are substantially equal, the composite will reflect, at somewhat greater efficiency, substantially the same band width and spectral range of reflectivity (i.e., "band") as the individual sheets. If the optical thicknesses of pairs of layers within the sheets are not substantially equal, the composite will reflect across a broader band width than the individual sheets. A composite combining mirror sheets with polarizer sheets is useful for increasing total reflectance while still polarizing transmitted light. Alternatively, a single sheet may be asymmetrically biaxially stretched to produce a film having selective reflective and polarizing properties.

The preferred selected polymer for use in a biaxially stretched mirror application is based on terephthalic, isophthalic, sebacic, azelaic or cyclohexanedicarboxylic acid to attain the lowest possible refractive index while still maintaining adhesion to the PEN layers. Naphthalene dicarboxylic acid may still be employed in minor amounts to improve the adhesion to PEN. The diol component may be taken from any that have been previously mentioned. Preferably the selected polymer has an index of refraction of less than 1.65 and more preferably an index of refraction of less than 1.55.

It is not required that the selected polymer be a copolyester or copolycarbonate. Vinyl polymers and copolymers made from monomers such as vinyl naphthalenes, styrenes, ethylene, maleic anhydride, acrylates, methacrylates, might be employed. Condensation polymers other than polyesters and polycarbonates might also be useful, examples include: polysulfones, polyamides, polyurethanes, polyamic acids, polyimides. Naphthalene groups and halogens such as chlorine, bromine and iodine are useful in increasing the refractive index of the selected polymer to the desired level (1.59 to 1.69) to substantially match the refractive index of PEN associated with the transverse direction for a polarizer. Acrylate groups and fluorine are particularly useful in decreasing refractive index for use in a mirror.

The relationships between the indices of refraction in each film layer to each other and to those of the other layers in the film stack determine the reflectance behavior of the multilayer stack at any angle of incidence, from any azimuthal direction. Assuming that all layers of the same material have the same indices, then a single interface of a two component quarterwave stack can be analyzed to understand the behavior of the entire stack as a function of angle.

For simplicity of discussion, therefore, the optical behavior of a single interface will be described. It shall be understood, however, that an actual multilayer stack according to the principles described herein could be made of tens, hundreds or thousands of layers. To describe the optical behavior of a single interface, such as the one shown in FIG. 2, the reflectivity as a function of angle of incidence for s and p polarized light for a plane of incidence including the z-axis and one in-plane optic axis will be plotted.

FIG. 2 shows two material film layers forming a single interface, with both immersed in an isotropic medium of index no. For simplicity of illustration, the present discussion will be directed toward an orthogonal multilayer birefringent system with the optical axes of the two materials aligned, and with one optic axis (z) perpendicular to the film plane, and the other optic axes along the x and y axis. It shall be understood, however, that the optic axes need not be orthogonal, and that nonorthogonal systems are well within the spirit and scope of the present invention. It shall be further understood that the optic axes also need not be aligned with the film axes to fall within the intended scope of the present invention.

The reflectivity of a dielectric interface varies as a function of angle of incidence, and for isotropic materials, is different for p and s polarized light. The reflectivity minimum for p polarized light is due to the so called Brewster effect, and the angle at which the reflectance goes to zero is referred to as Brewster's angle.

The reflectance behavior of any film stack, at any angle of incidence, is determined by the dielectric tensors of all films involved. A general theoretical treatment of this topic is given in the text by R. M. A. Azzam and N. M. Bashara, "Ellipsometry and Polarized Light", published by North-Holland, 1987.

The reflectivity for a single interface of a system is calculated by squaring the absolute value of the reflection coefficients for p and s polarized light, given by equations 1 and 2, respectively. Equations 1 and 2 are valid for uniaxial orthogonal systems, with the axes of the two components aligned.

$$1) \quad r_p = \frac{n_{2z} * n_{20} \sqrt{n_{1z}^2 - n_o^2 \mathrm{Sin}^2\theta} - n_{1z} * n_{10} \sqrt{n_{2z}^2 - n_o^2 \mathrm{Sin}^2\theta}}{n_{2z} * n_{20} \sqrt{n_{1z}^2 - n_o^2 \mathrm{Sin}^2\theta} + n_{1z} * n_{10} \sqrt{n_{2z}^2 - n_o^2 \mathrm{Sin}^2\theta}}.$$

-continued $$2) \quad r_s = \frac{\sqrt{n_{10}^2 - n_o^2 \mathrm{Sin}^2\theta} - \sqrt{n_{20}^2 - n_o^2 \mathrm{Sin}^2\theta}}{\sqrt{n_{10}^2 - n_o^2 \mathrm{Sin}^2\theta} + \sqrt{n_{20}^2 - n_o^2 \mathrm{Sin}^2\theta}}.$$

where θ is measured in the isotropic medium.

In a uniaxial birefringent system, n1x=n1y=n1o, and n2x=n2y=n2o.

For a biaxial birefringent system, equations 1 and 2 are valid only for light with its plane of polarization parallel to the x-z or y-z planes, as defined in FIG. 10. So, for a biaxial system, for light incident in the x-z plane, n1o=n1x and n2o=n2x in equation 1 (for p-polarized light), and n1o=n1y and n2o=n2y in equation 2 (for s-polarized light). For light incident in the y-z plane, n1o=n1y and n2o=n2y in equation 1 (for p-polarized light), and n1o=n1x and n2o=n2x in equation 2 (for s-polarized light).

Equations 1 and 2 show that reflectivity depends upon the indices of refraction in the x, y (in-plane) and z directions of each material in the stack. In an isotropic material, all three indices are equal, thus nx=ny=nz. The relationship between nx, ny and nz determine the optical characteristics of the material. Different relationships between the three indices lead to three general categories of materials: isotropic, uniaxially birefringent, and biaxially birefringent. Equations 1 and 2 describe biaxially birefringent cases only along the x- or y-axis, and then only if considered separately for the x and y directions.

A uniaxially birefringent material is defined as one in which the index of refraction in one direction is different from the indices in the other two directions. For purposes of the present discussion, the convention for describing uniaxially birefringent systems is for the condition nx=ny≠nz. The x- and y-axes are defined as the in-plane axes and the respective indices, nx and ny, will be referred to as the in-plane indices.

One method of creating a uniaxial birefringent system is to biaxially stretch (e.g., stretch along two dimensions) a multilayer stack in which at least one of the materials in the stack has its index of refraction affected by the stretching process (e.g., the index either increases or decreases). Biaxial stretching of the multilayer stack may result in differences between refractive indices of adjoining layers for planes parallel to both axes thus resulting in reflection of light in both planes of polarization.

A uniaxial birefringent material can have either positive or negative uniaxial birefringence. Positive uniaxial birefringence occurs when the z-index is greater than the in-plane indices (nz>nx and ny). Negative uniaxial birefringence occurs when the z-index is less than the in-plane indices (nz<nx and ny).

A biaxial birefringent material is defined as one in which the indices of refraction in all three axes are different, e.g., nx≠ny≠nz. Again, the nx and ny indices will be referred to as the in-plane indices. A biaxial birefringent system can be made by stretching the multilayer stack in one direction. In other words the stack is uniaxially stretched. For purposes of the present discussion, the x direction will be referred to as the stretch direction for biaxial birefringent stacks.

Uniaxial Birefringent Systems (Mirrors)

The optical properties and design considerations of uniaxial birefringent systems will now be discussed. As discussed above, the general conditions for a uniaxial birefringent material are nx=ny≠nz. Thus if each layer 102 and 104 in FIG. 2 is uniaxially birefringent, n1x=n1y and n2x=n2y. For purposes of the present discussion, assume that layer 102 has larger in-plane indices than layer 104, and that thus n1>n2 in both the x and y directions. The optical behavior of a uniaxial birefringent multilayer system can be adjusted by varying the values of n1z and n2z to introduce different levels of positive or negative birefringence. The relationship between the various indices of refraction can be measured directly, or, the general relationship may be indirectly observed by analysis of the spectra of the resulting film as described herein.

In the case of mirrors, the desired average transmission for light of each polarization and plane of incidence generally depends upon the intended use of the mirror. The average transmission along each stretch direction at normal incidence for a narrow bandwidth mirror across a 100 nm bandwidth within the visible spectrum is desirably less than 30%, preferably less than 20% and more preferably less than 10%. A desirable average transmission along each stretch direction at normal incidence for a partial mirror ranges anywhere from, for example, 10% to 50%, and can cover a bandwidth of anywhere between, for example, 100 nm and 450 nm, depending upon the particular application. For a high efficiency mirror, average transmission along each stretch direction at normal incidence over the visible spectrum (400–700 nm) is desirably less than 10%, preferably less than 5%, more preferably less than 2%, and even more preferably less than 1%. In addition, asymmetric mirrors may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400–700 nm), or over the visible spectrum and into the near infrared (e.g, 400–850 nm).

Equation 1 described above can be used to determine the reflectivity of a single interface in a uniaxial birefringent system composed of two layers such as that shown in FIG. 2. Equation 2, for s polarized light, is identical to that of the case of isotropic films (nx=ny=nz), so only equation 1 need be examined. For purposes of illustration, some specific, although generic, values for the film indices will be assigned. Let n1x=n1y=1.75, n1z=variable, n2x=n2y=1.50, and n2z=variable. In order to illustrate various possible Brewster angles in this system, no=1.60 for the surrounding isotropic media.

Figure 16:
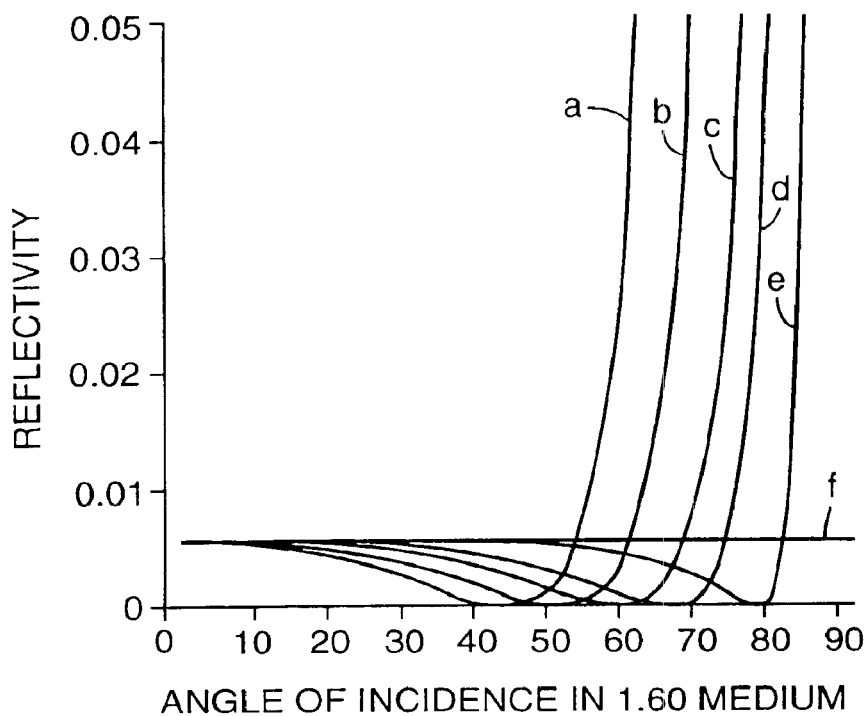
FIGS. 16 and 17 show reflectivity versus angle curves for a uniaxial birefringent system in a medium of index 1.60.

FIG. 16 shows reflectivity versus angle curves for p-polarized light incident from the isotropic medium to the birefringent layers, for cases where n1z is numerically greater than or equal to n2z (n1z≧n2z). The curves shown in FIG. 16 are for the following z-index values: a) n1z=1.75, n2z=1.50; b) n1z=1.75, n2z=1.57; c) n1z=1.70, n2z=1.60; d) n1z=1.65, n2z=1.60; e) n1z=1.61; n2z=1.60; and f) n1z=1.60=n2z. As n1z approaches n2z, the Brewster angle, the angle at which reflectivity goes to zero, increases. Curves a–e are strongly angular dependent. However, when n1z=n2z (curve f), there is no angular dependence to reflectivity. In other words, the reflectivity for curve f is constant for all angles of incidence. At that point, equation 1 reduces to the angular independent form: (n2o−n1o)/(n2o+n1o). When n1z=n2z, there is no Brewster effect and there is constant reflectivity for all angles of incidence.

Figure 17:
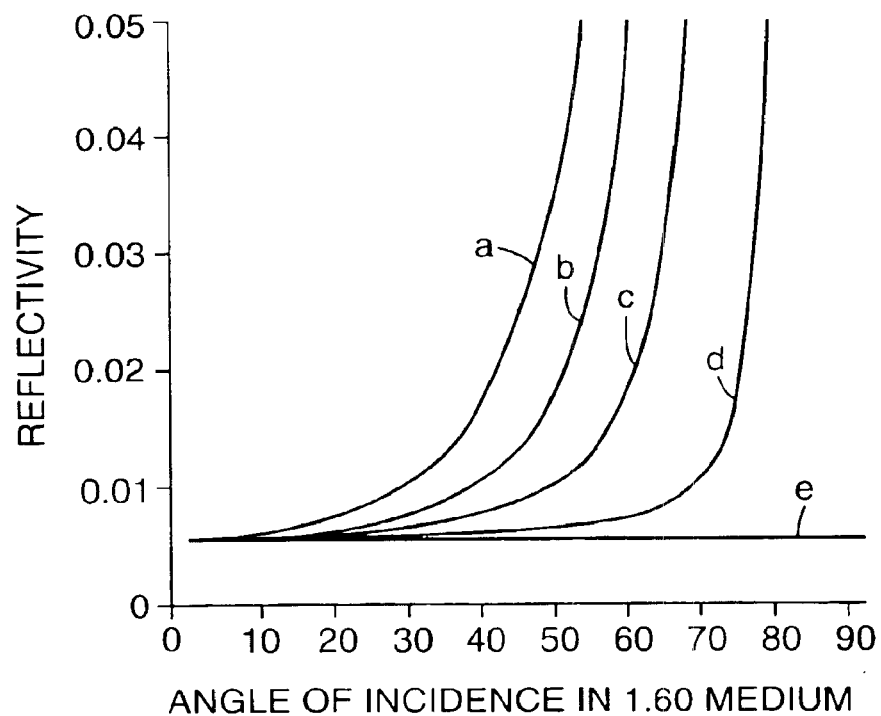

FIG. 17 shows reflectivity versus angle of incidence curves for cases where n1z is numerically less than or equal to n2z. Light is incident from isotropic medium to the birefringent layers. For these cases, the reflectivity monotonically increases with angle of incidence. This is the behavior that would be observed for s-polarized light. Curve a in FIG. 17 shows the single case for s polarized light. Curves b–e show cases for p polarized light for various values of nz, in the following order: b) n1z=1.50, n2z=1.60; c) n1z=1.55, n2z=1.60; d) n1z=1.59, n2z=1.60; and e) n1z=1.60=n2z. Again, when n1z=n2z (curve e), there is no Brewster effect, and there is constant reflectivity for all angles of incidence.

Figure 18:
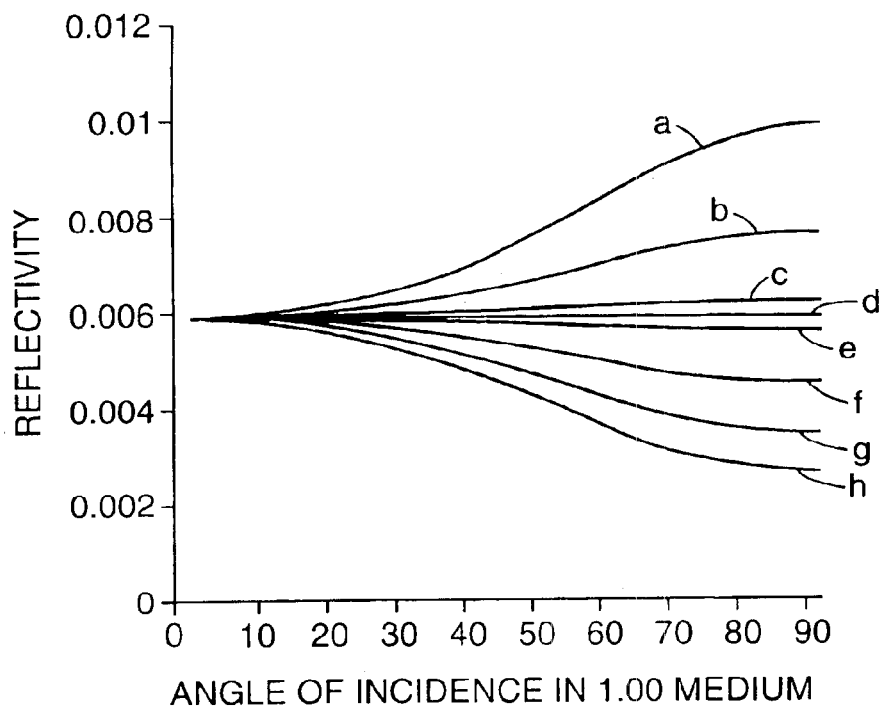
FIG. 18 shows reflectivity versus angle curves for a uniaxial birefringent system in a medium of index 1.0.

FIG. 18 shows the same cases as FIGS. 16 and 17 but for an incident medium of index no=1.0 (air). The curves in FIG. 18 are plotted for p polarized light at a single interface of a positive uniaxial material of indices n2x=n2y=1.50, n2z=1.60, and a negative uniaxially birefringent material with n1x=n1y=1.75, and values of n1z, in the following order, from top to bottom, of: a) 1.50; b) 1.55; c) 1.59; d) 1.60; f) 1.61; g) 1.65; h) 1.70; and i) 1.75. Again, as was shown in FIGS. 16 and 17, when the values of n1z and n2z match (curve d), there is no angular dependence to reflectivity.

FIGS. 16, 17, and 18 show that the cross-over from one type of behavior to another occurs when the z-axis index of one film equals the z-axis index of the other film. This is true for several combinations of negative and positive uniaxially birefringent, and isotropic materials. Other situations occur in which the Brewster angle is shifted to larger or smaller angles.

Figure 19:
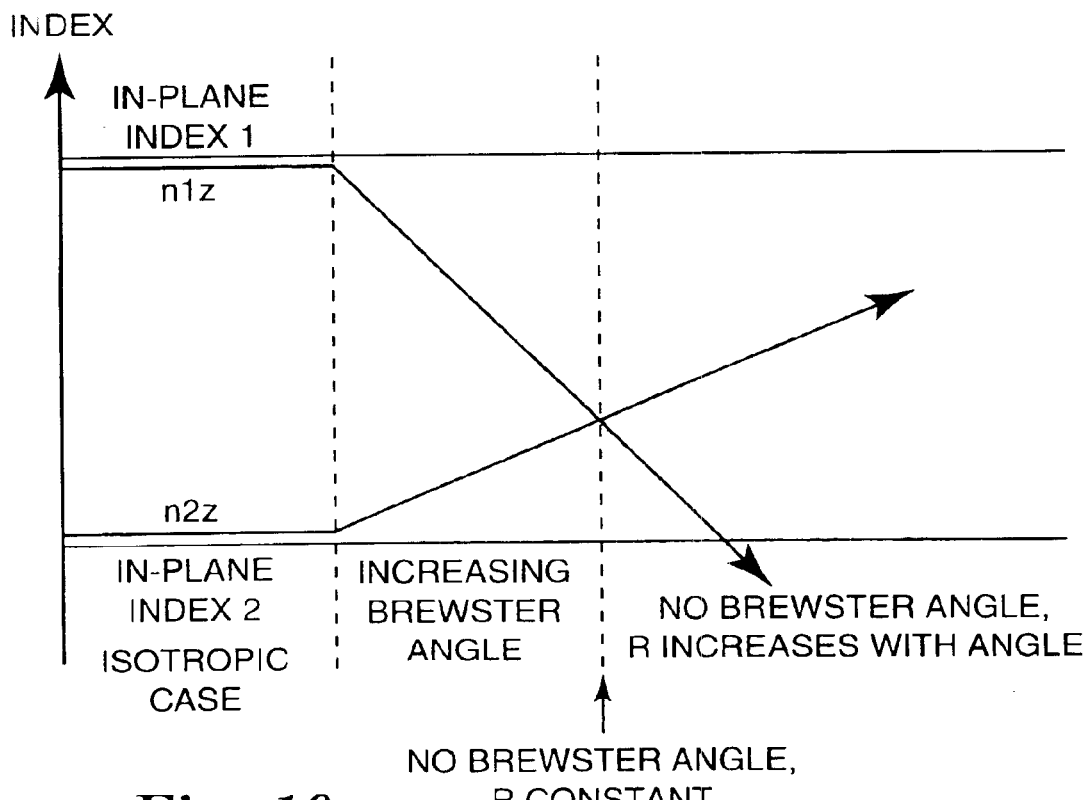
FIGS. 19, 20, and 21 show various relationships between in-plane indices and z-index for a uniaxial birefringent system.
Figure 20:
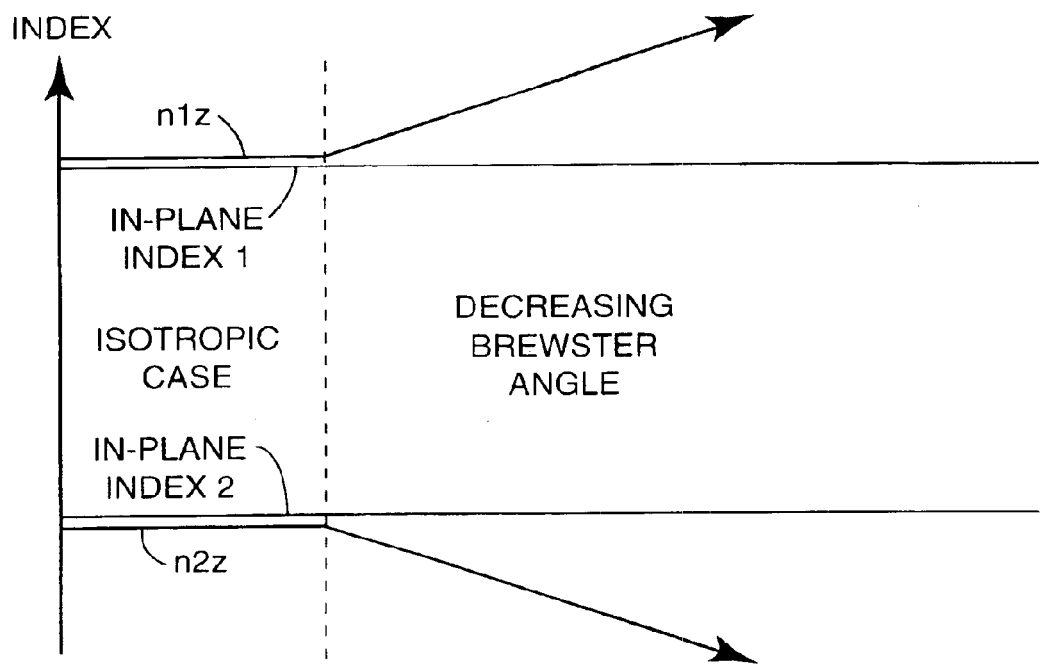
Figure 21:
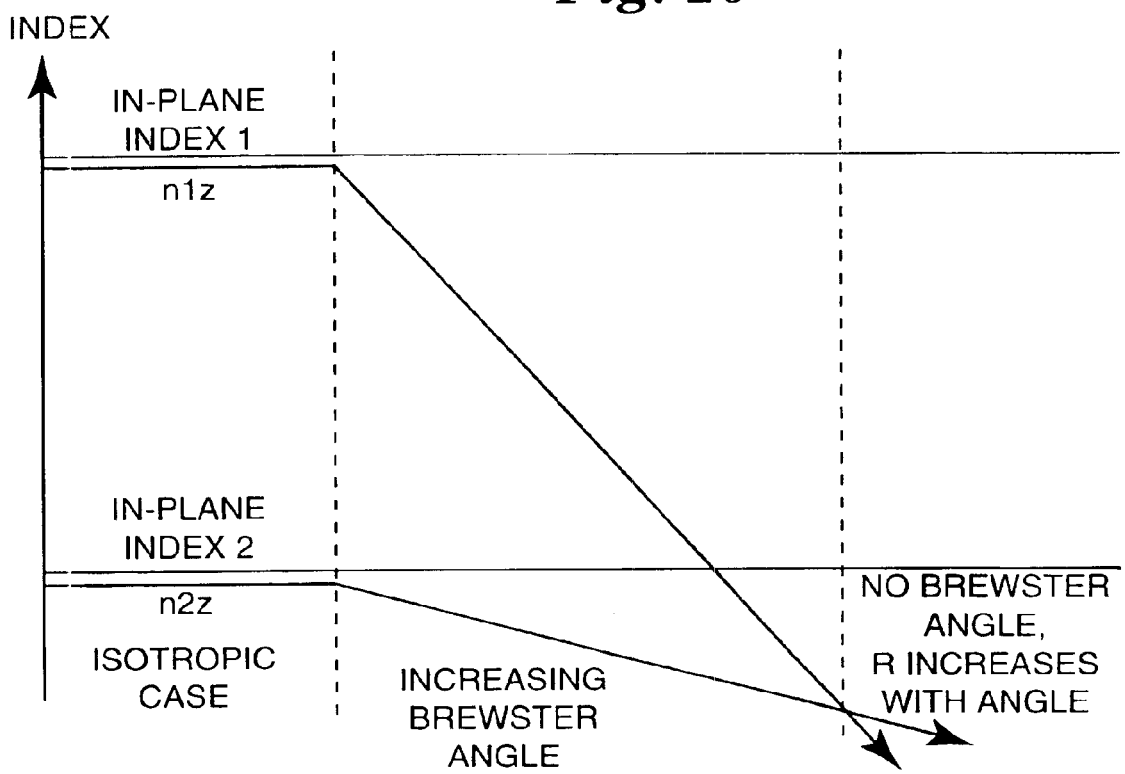

Various possible relationships between in-plane indices and z-axis indices are illustrated in FIGS. 19, 20, and 21. The vertical axes indicate relative values of indices and the horizontal axes are used to separate the various conditions. Each Figure begins at the left with two isotropic films, where the z-index equals the in-plane indices. As one proceeds to the right, the in-plane indices are held constant and the various z-axis indices increase or decrease, indicating the relative amount of positive or negative birefringence.

The case described above with respect to FIGS. 16, 17, and 18 is illustrated in FIG. 19. The in-plane indices of material one are greater than the in-plane indices of material two, material 1 has negative birefringence (n1z less than in-plane indices), and material two has positive birefringence (n2z greater than in-plane indices). The point at which the Brewster angle disappears and reflectivity is constant for all angles of incidence is where the two z-axis indices are equal. This point corresponds to curve f in FIG. 16, curve e in FIG. 17 or curve d in FIG. 18.

In FIG. 20, material one has higher in-plane indices than material two, but material one has positive birefringence and material two has negative birefringence. In this case, the Brewster minimum can only shift to lower values of angle.

Both FIGS. 19 and 20 are valid for the limiting cases where one of the two films is isotropic. The two cases are where material one is isotropic and material two has positive birefringence, or material two is isotropic and material one has negative birefringence. The point at which there is no Brewster effect is where the z-axis index of the birefringent material equals the index of the isotropic film.

Another case is where both films are of the same type, i.e., both negative or both positive birefringent. FIG. 21 shows the case where both films have negative birefringence. However, it shall be understood that the case of two positive birefringent layers is analogous to the case of two negative birefringent layers shown in FIG. 21. As before, the Brewster minimum is eliminated only if one z-axis index equals or crosses that of the other film.

Yet another case occurs where the in-plane indices of the two materials are equal, but the z-axis indices differ. In this case, which is a subset of all three cases shown in FIGS. 19–21, no reflection occurs for s polarized light at any angle, and the reflectivity for p polarized light increases monotonically with increasing angle of incidence. This type of article has increasing reflectivity for p-polarized light as angle of incidence increases, and is transparent to s-polarized light. This article can be referred to as a "p-polarizer".

The above described principles and design considerations describing the behavior of uniaxially birefringent systems can be applied to create multilayer stacks having the desired optical effects for a wide variety of circumstances and applications. The indices of refraction of the layers in the multilayer stack can be manipulated and tailored to produce devices having the desired optical properties. Many negative and positive uniaxial birefringent systems can be created with a variety of in-plane and z-axis indices, and many useful devices can be designed and fabricated using the principles described here.

Biaxial Birefringent Systems (Polarizers)

Referring again to FIG. 2, two component orthogonal biaxial birefringent systems and the design considerations affecting the resultant optical properties will now be described. Again, the system can have many layers, but an understanding of the optical behavior of the stack is achieved by examining the optical behavior at one interface.

A biaxial birefringent system can be designed to give high reflectivity for light with its plane of polarization parallel to one axis, for a broad range of angles of incidence, and simultaneously have low reflectivity and high transmission for light with its plane of polarization parallel to the other axis for a broad range of angles of incidence. As a result, the biaxial birefringent system acts as a polarizer, transmitting light of one polarization and reflecting light of the other polarization. By controlling the three indices of refraction of each film, nx, ny and nz, the desired polarizer behavior can be obtained. Again, the indices of refraction can be measured directly or can be indirectly observed by analysis of the spectra of the resulting film, as described herein.

Referring again to FIG. 2, the following values to the film indices are assigned for purposes of illustration: n1x=1.88, n1y=1.64, n1z=variable, n2x=1.65, n2y=variable, and n2z=variable. The x direction is referred to as the extinction direction and the y direction as the transmission direction.

Equation 1 can be used to predict the angular behavior of the biaxial birefringent system for two important cases of light with a plane of incidence in either the stretch (xz plane) or the non-stretch (yz plane) directions. The polarizer is a mirror in one polarization direction and a window in the other direction. In the stretch direction, the large index differential of 1.88−1.65=0.23 in a multilayer stack with hundreds of layers will yield very high reflectivities for s-polarized light. For p-polarized light the reflectance at various angles depends on the n1z/n2z index differential.

Reflectivity at off-normal angles, for light with its plane of polarization parallel to the transmission axis may be caused by a large z-index mismatch, even if the in-plane y indices are matched. The resulting system thus has large reflectivity for p, and is highly transparent to s polarized light. This case was referred to above in the analysis of the mirror cases as a "p polarizer".

For uniaxially stretched polarizers, performance depends upon the relationships between the alternating layer indices for all three (x, y, and z) directions. As described herein, it is desirable to minimize the y and z index differentials for a high efficiency polarizer. Introduction of a y-index mismatch is describe to compensate for a z-index mismatch. Whether intentionally added or naturally occurring, any index mismatch will introduce some reflectivity. An important factor thus is making the x-index differential larger than the y- and z-index differentials. Since reflectivity increases rapidly as a function of index differential in both the stretch and non-stretch directions, the ratios Δny/Δnx and Δnz/Δnx should be minimized to obtain a polarizer having high extinction along one axis across the bandwidth of interest and also over a broad range of angles, while preserving high transmission along the orthogonal axis. Ratios of less than 0.05, 0.1 or 0.25 are acceptable. Ideally, the ratio Δnz/Δnx is 0, but ratios of less than 0.25 or 0.5 also produce a useable polarizer.

Figure 22:
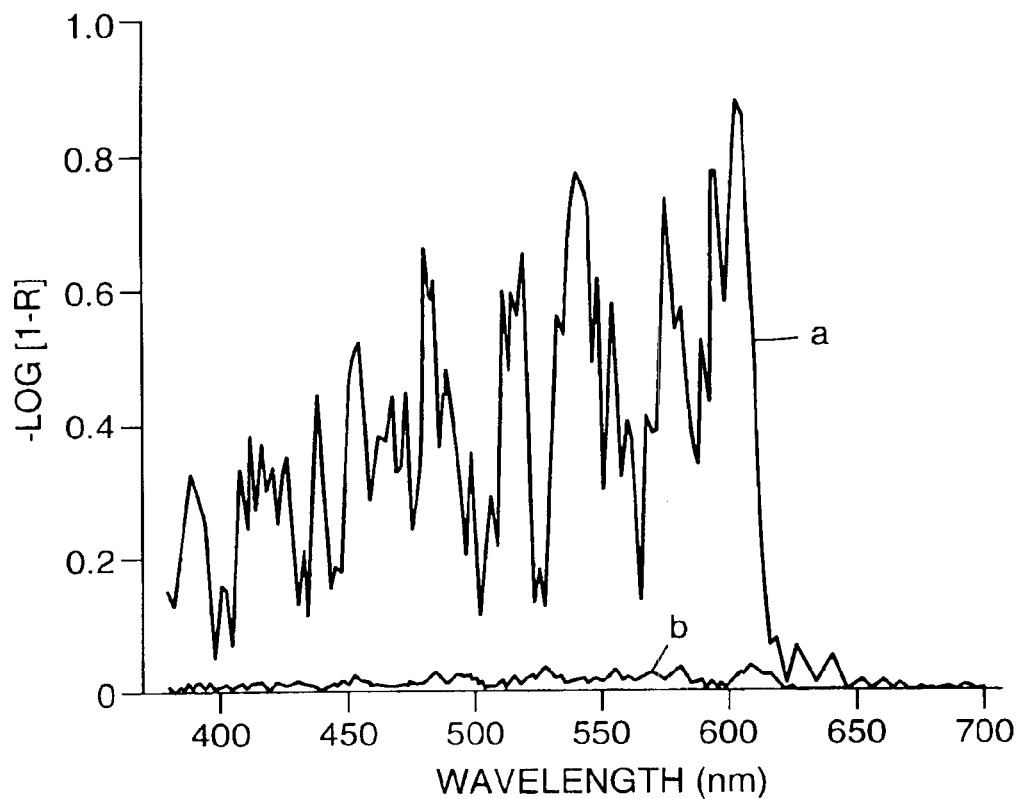
FIG. 22 shows off axis reflectivity versus wavelength for two different biaxial birefringent systems.

FIG. 22 shows the reflectivity (plotted as −Log[1−R]) at 75° for p polarized light with its plane of incidence in the non-stretch direction, for an 800 layer stack of PEN/coPEN. The reflectivity is plotted as function of wavelength across the visible spectrum (400–700 nm). The relevant indices for curve a at 550 nm are n1y=1.64, n1z=1.52, n2y=1.64 and n2z=1.63. The model stack design is a linear thickness grade for quarterwave pairs, where each pair thickness is given by dn=do+do(0.003)n. All layers were assigned a random thickness error with a gaussian distribution and a 5% standard deviation.

Curve a shows high off-axis reflectivity across the visible spectrum along the transmission axis (the y-axis) and that different wavelengths experience different levels of reflectivity. This is due to the large z-index mismatch (Δnz=0.11). Since the spectrum is sensitive to layer thickness errors and spatial nonuniformities, such as film caliper, this gives a biaxial birefringent system with a very nonuniform and "colorful" appearance. Although a high degree of color may be desirable for certain applications, it is desirable to control the degree of off-axis color, and minimize it for those applications requiring a uniform, low color appearance, such as liquid crystal displays or other types of displays.

Off-axis reflectivity, and off-axis color can be minimized by introducing an index mismatch to the non-stretch in-plane indices (n1y and n2y) that create a Brewster condition off axis, while keeping the s-polarization reflectivity to a minimum.

Figure 23:
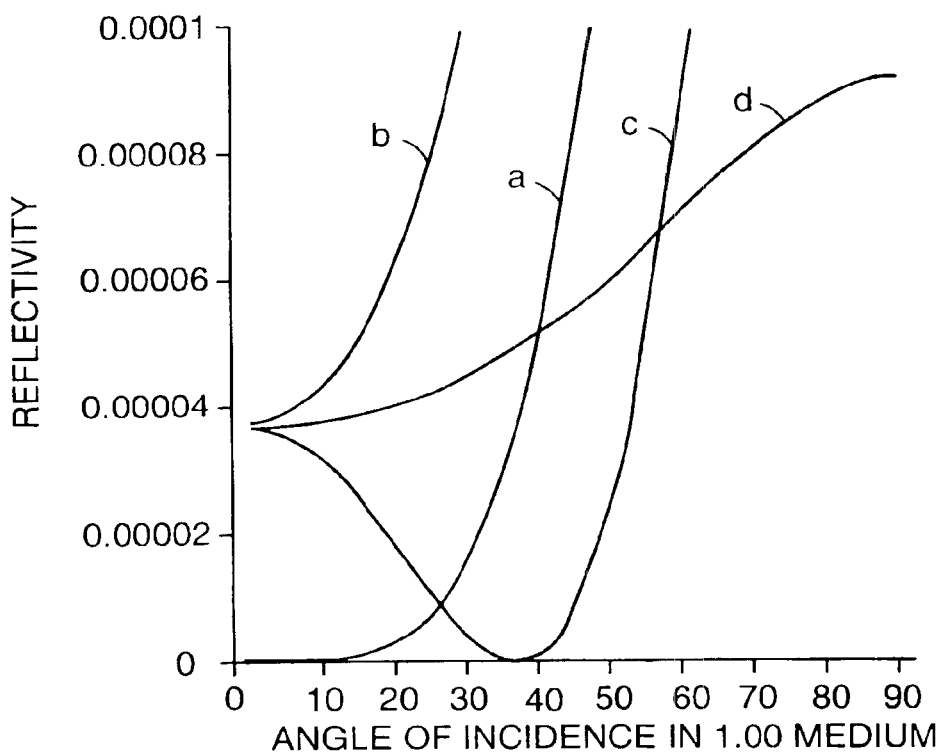
FIG. 23 shows the effect of introducing a y-index difference in a biaxial birefringent film with a large z-index difference.

FIG. 23 explores the effect of introducing a y-index mismatch in reducing off-axis reflectivity along the transmission axis of a biaxial birefringent system. With n1z=1.52 and n2z=1.63 (Δnz=0.11), the following conditions are plotted for p polarized light: a) n1y=n2y=1.64; b) n1y=1.64, n2y=1.62; c) n1y=1.64, n2y=1.66. Curve a show the reflectivity where the in-plane indices n1y and n2y are equal. Curve a has a reflectance minimum at 0°, but rises steeply after 20°. For curve b, n1y>n2y, and reflectivity increases rapidly. Curve c, where n1y<n2y, has a reflectance minimum at 38°, but rises steeply thereafter. Considerable reflection occurs as well for s polarized light for n1y≠n2y, as shown by curve d. Curves a–d of FIG. 23 indicate that the sign of the y-index mismatch (n1y−n2y) should be the same as the z-index mismatch (n1z−n2z) for a Brewster minimum to exist. For the case of n1y=n2y, reflectivity for s polarized light is zero at all angles.

By reducing the z-axis index difference between layers, the off axis reflectivity can be further reduced. If n1z is equal to n2z, FIG. 18 indicates that the extinction axis will still have a high reflectivity off-angle as it does at normal incidence, and no reflection would occur along the non-stretch axis at any angle because both indices are matched (e.g., n1y=n2y and n1z=n2z).

Exact matching of the two y indices and the two z indices may not be possible in some multilayer systems. If the z-axis indices are not matched in a polarizer construction, introduction of a slight mismatch may be desired for in-plane indices n1y and n2y. This can be done by blending additional components into one or both of the material layers in order to increase or decrease the respective y index. Blending a second resin into either the polymer that forms the highly birefringent layers or into the polymer that forms the selected polymer layers may be done to modify reflection for the transmission axis at normal and off-normal angles, or to modify the extinction of the polarizer for light polarized in the extinction axis. The second, blended resin may accomplish this by modifying the crystallinity and the index of refraction of the polymer layers after orientation.

Figure 24:
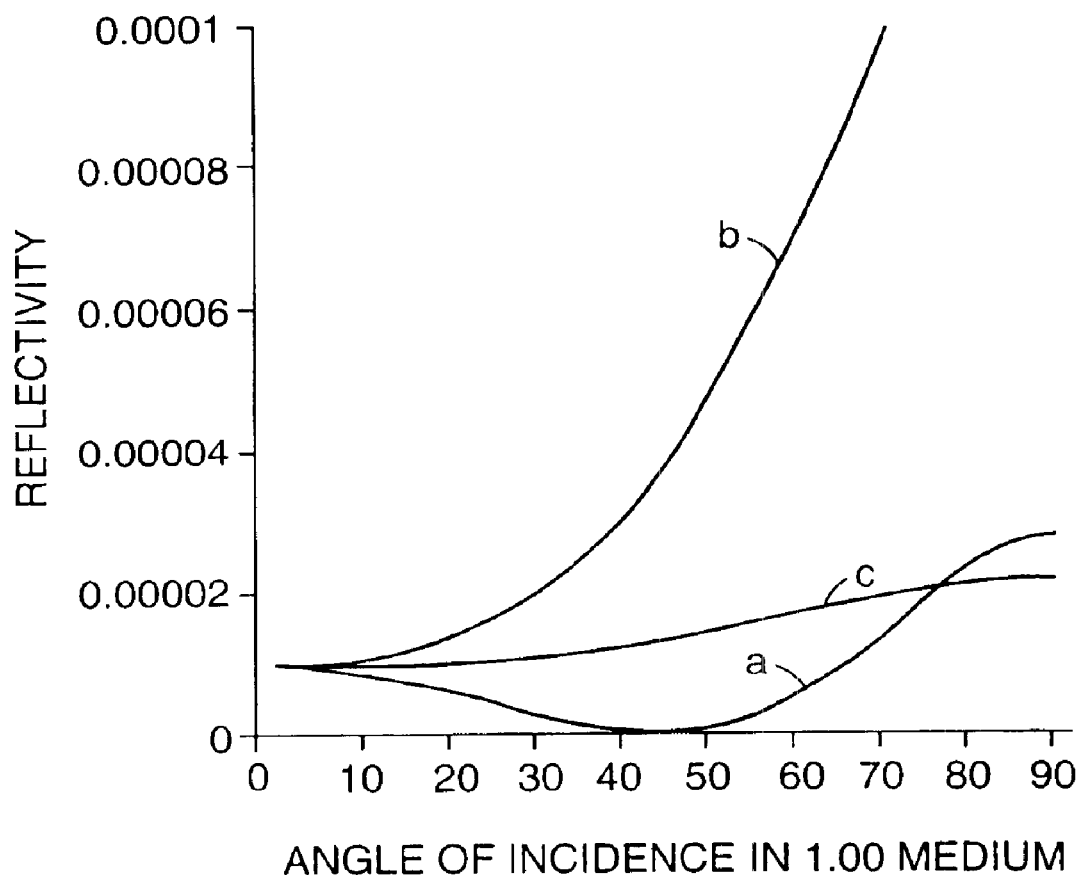
FIG. 24 shows the effect of introducing a y-index difference in a biaxial birefringent film with a smaller z-index difference.

Another example is plotted in FIG. 24, assuming n1z=1.56 and n2z=1.60 ($\Delta$nz=0.04), with the following y indices a) n1y=1.64, n2y=1.65; b) n1y=1.64, n2y=1.63. Curve c is for s-polarized light for either case. Curve a, where the sign of the y-index mismatch is the same as the z-index mismatch, results in the lowest off-angle reflectivity.

The computed off-axis reflectance of an 800 layer stack of films at 75° angle of incidence with the conditions of curve a in FIG. 24 is plotted as curve b in FIG. 22. Comparison of curve b with curve a in FIG. 22 shows that there is far less off-axis reflectivity, and therefore lower perceived color and better uniformity, for the conditions plotted in curve b. The relevant indices for curve b at 550 nm are n1y=1.64, n1z=1.56, n2y=1.65 and n2z 1.60.

Figure 25:
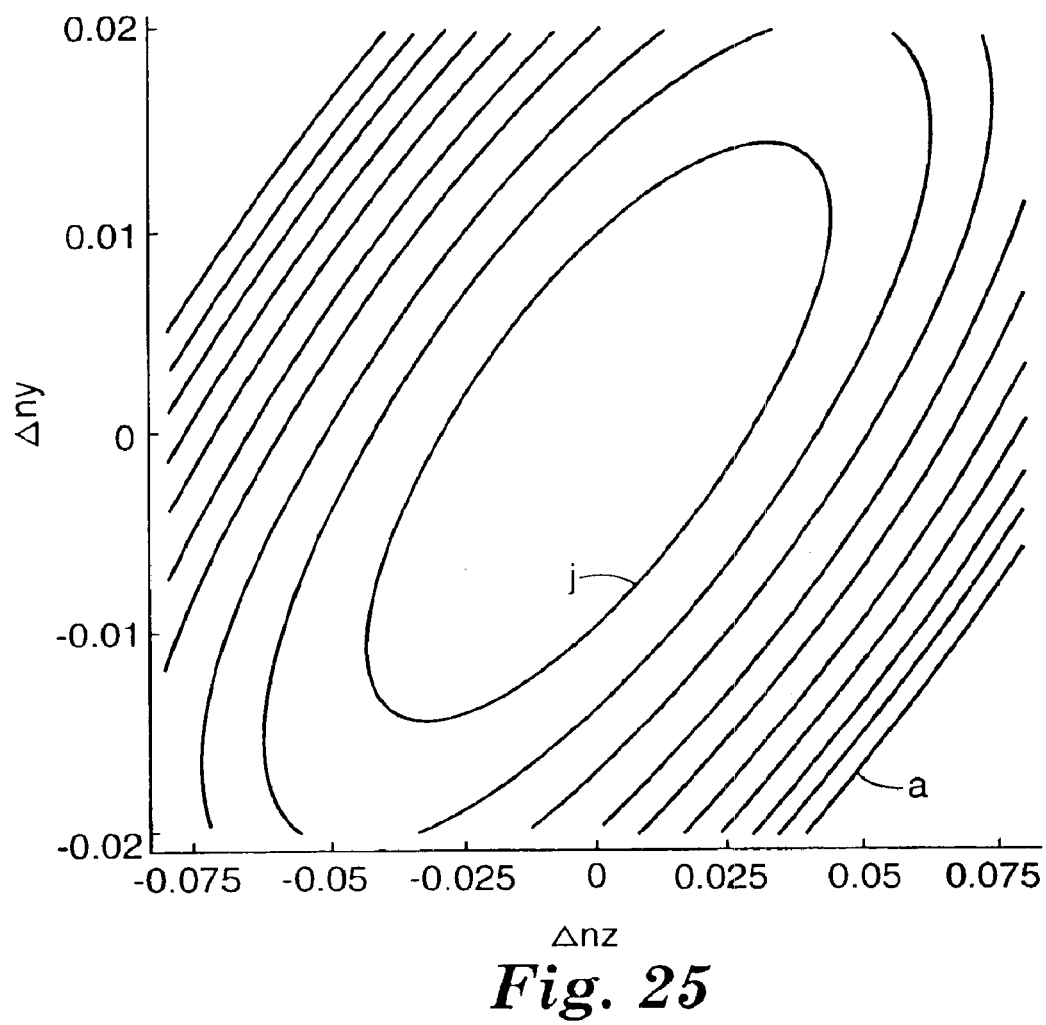
FIG. 25 shows a contour plot summarizing the information from FIGS. 23 and 24.

FIG. 25 shows a contour plot of equation 1 which summarizes the off axis reflectivity discussed in relation to FIG. 2 for p-polarized light. The four independent indices involved in the non-stretch direction have been reduced to two index mismatches, $\Delta$nz and $\Delta$ny. The plot is an average of 6 plots at various angles of incidence from 0° to 75° in 15 degree increments. The reflectivity ranges from $0.4 \times 10^{-4}$ for contour j, to $4.0 \times 10^{-4}$ for contour a, in constant increments of $0.4 \times 10^{-4}$. The plots indicate how high reflectivity caused by an index mismatch along one optic axis can be offset by a mismatch along the other axis.

Thus, by reducing the z-index mismatch between layers of a biaxial birefringent systems, and/or by introducing a y-index mismatch to produce a Brewster effect, off-axis reflectivity, and therefore off-axis color, are minimized along the transmission axis of a multilayer reflecting polarizer.

Materials Selection and Processing

With the above-described design considerations established, one of ordinary skill will readily appreciate that a wide variety of materials can be used to form multilayer mirrors or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite to or the same as that of the first material. Or, the second material may have no birefringence.

What is claimed is:

1. An optical device comprising opposing optical surfaces arranged to form a wedge, at least a portion of the opposing optical surfaces comprising a multilayer optical film that comprises alternating layers of at least two materials, wherein the multilayer optical film reflects light over a wavelength band of interest as a function of thicknesses of the alternating layers, and further wherein at least one of the materials has a stress induced birefringence.

2. An optical device comprising opposing optical surfaces arranged to form a wedge, at least a portion of the opposing optical surfaces comprising a multilayer optical film that comprises alternating layers of at least two materials, and further wherein at least one of the materials has a stress induced birefringence, wherein the multilayer optical film comprises alternating first and second polymeric materials, wherein the absolute value of the difference in index of refraction between the first and second polymeric material is $\Delta$nx along a first axis in the plane of the film and is $\Delta$nz along a second axis orthogonal to the plane of the film, and wherein the ratio $\Delta$nz/$\Delta$nx is less than 0.5.

3. An optical device comprising opposing optical surfaces arranged to form a wedge, at least a portion of the opposing optical surfaces comprising a multilayer optical film that comprises alternating layers of at least two materials, and further wherein at least one of the materials has a stress induced birefringence, wherein the multilayer optical film comprises alternating first and second polymeric materials, wherein the absolute value of the difference in index of refraction between the first and second polymeric material is $\Delta$nx along an in-plane direction of the film and is $\Delta$nz along a thickness direction of the film, end wherein $\Delta$nx is at least 0.05 and $\Delta$nz is less than $\Delta$nx.

4. The optical device of claim 1, wherein the multilayer optical film comprises alternating first and second polymeric materials, wherein the first polymeric material is birefringent and the second polymeric material is isotropic.

5. The optical device of either of claim 1 or 2, wherein the multilayer optical film is a mirror.

6. The optical device of either of claim 1 or 2, wherein the optical device is hollow.

7. The optical device of either of claim 1 or 2, wherein the opposing optical surfaces form a cone.

8. The optical device of either of claim 1 or 2, wherein the opposing optical surfaces form a parabola.

9. The optical device of either of claim 1 or 2, wherein the opposing optical surfaces are portions of a continuous surface.

10. The optical device of either of claim 1 or 2, wherein the optical device is suitable for receiving solar illumination.

11. An optical device comprising opposing optical surfaces arranged to form a light pipe, at least a portion of the opposing optical surfaces comprising a multilayer optical film that comprises alternating layers of at least two materials, wherein the multilayer optical film reflects light over a wavelength band of interest as a function of thicknesses of the alternating layers, and further wherein at least one of the materials has a stress induced birefringence.

12. An optical device comprising opposing optical surfaces arranged to form a light pipe, at least a portion of the opposing optical surfaces comprising a multilayer optical film that comprises alternating layers of at least two materials, and further wherein at least one of the materials has a stress induced birefringence, wherein the multilayer optical film comprises alternating first and second polymeric materials, wherein the absolute value of the difference in index of refraction between the first and second polymeric material is $\Delta$nx along a first axis in the plane of the film and is $\Delta$nz along a second axis orthogonal to the plane of the film, and wherein the ratio $\Delta$nz/$\Delta$nx is less than 0.5.

13. An optical device comprising opposing optical surfaces arranged to form a light pipe, at least a portion of the opposing optical surfaces comprising a multilayer optical film that comprises alternating layers of at least two materials, and further wherein at least one of the materials has a stress induced birefringence, wherein the multilayer optical film comprises alternating first and second polymeric materials, wherein the absolute value of the difference in index of refraction between the first and second polymeric material is $\Delta nx$ along an in-plane direction of the film and is $\Delta nz$ along a thickness direction of the film, and wherein $\Delta nx$ is at least 0.05 and $\Delta nz$ is less than $\Delta nx$.

14. The optical device of claim 11, wherein the multilayer optical film comprises alternating first and second polymeric materials, wherein the first polymeric material is birefringent and the second polymeric material is isotropic.

15. The optical device of either of claim 11 or 12, wherein the multilayer optical film is a mirror.

16. The optical device of either of claim 11 or 12, wherein the optical device is hollow.

17. The optical device of either of claim 11 or 12, wherein the opposing optical surfaces are portions of a continuous surface.

18. The optical device of either of claim 11 or 12, wherein the optical device has a circular cross-sectional shape.

19. The optical device of either of claim 11 or 12, wherein the optical device has a cross-sectional shape selected from the group consisting of ellipses and closed irregular curves.

20. The optical device of either of claim 11 or 12, wherein the optical device has a cross-sectional shape selected from the group consisting of triangles, squares, rectangles, and other polygonal shapes.

* * * * *

UNITED STATES PATENT AND TRADEMARK OFFICE
CERTIFICATE OF CORRECTION

PATENT NO. : 6,924,014 B2
DATED : August 2, 2005
INVENTOR(S) : Ouderkirk, Andrew J.

It is certified that error appears in the above-identified patent and that said Letters Patent is hereby corrected as shown below:

<u>Title page,</u>
Item [63], Related U.S. Application Data, delete "division" and insert -- divisional --.
Item [56], References Cited, U.S. PATENT DOCUMENTS, delete ",540,768" and insert -- 0,540,768 --.
OTHER PUBLICATIONS,
"Alfrey et al." reference, delete "Mulilayered" and insert -- Multilayered --.
"Boese et al." reference, delete "Polyimides0" and insert -- Polyimides --.
"Schrenk et al." reference, delete "p." and insert -- pp. --.
"Schrenk, W." reference, delete "in" and insert -- In --.

<u>Column 5,</u>
Line 65, delete "e.g," and insert -- e.g., --.

<u>Column 6,</u>
Line 26, after "85%" insert -- , --.

<u>Column 9,</u>
Line 31, delete "Zang et. al.," and insert -- Zang et al., --.
Line 44, after "(PEN)" delete ",".

<u>Column 12,</u>
Line 67, delete "direciton" and insert -- direction --.

<u>Column 13,</u>
Line 24, after "only" delete "24" and insert -- 2-4 --.

<u>Column 25,</u>
Line 32, delete "e.g," and insert -- e.g., --.

<u>Column 28,</u>
Line 42, delete "show" and insert -- shows --.

<u>Column 29,</u>
Line 22, after "n2z" insert -- = --.

<u>Column 30,</u>
Line 23, delete "end" and insert -- and --.
Lines 29, 31, 33, 35, 37 and 40, delete "claim" and insert -- claims --.

UNITED STATES PATENT AND TRADEMARK OFFICE
CERTIFICATE OF CORRECTION

PATENT NO. : 6,924,014 B2
DATED : August 2, 2005
INVENTOR(S) : Ouderkirk, Andrew J.

It is certified that error appears in the above-identified patent and that said Letters Patent is hereby corrected as shown below:

Column 31,
Lines 11 and 13, delete "claim" and insert -- claims --.

Column 32,
Lines 1, 4, 6 and 9, delete "claim" and insert -- claims --.

Signed and Sealed this

Twentieth Day of December, 2005

JON W. DUDAS
*Director of the United States Patent and Trademark Office*